US007954962B2

(12) United States Patent
Mizushima et al.

(10) Patent No.: US 7,954,962 B2
(45) Date of Patent: Jun. 7, 2011

(54) LASER IMAGE DISPLAY, AND OPTICAL INTEGRATOR AND LASER LIGHT SOURCE PACKAGE USED IN SUCH LASER IMAGE DISPLAY

(75) Inventors: Tetsuro Mizushima, Osaka (JP); Ken'ichi Kasazumi, Osaka (JP); Tatsuo Itoh, Osaka (JP); Tomoya Sugita, Osaka (JP); Kazuhisa Yamamoto, Osaka (JP); Shin-ichi Kadowaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 638 days.

(21) Appl. No.: 11/997,117

(22) PCT Filed: Jun. 1, 2006

(86) PCT No.: PCT/JP2006/311002
§ 371 (c)(1),
(2), (4) Date: Jan. 28, 2008

(87) PCT Pub. No.: WO2007/013221
PCT Pub. Date: Feb. 1, 2007

(65) Prior Publication Data
US 2010/0165307 A1    Jul. 1, 2010

(30) Foreign Application Priority Data

Jul. 28, 2005   (JP) ................................. 2005-218259

(51) Int. Cl.
*G02B 13/20*   (2006.01)
*G03B 21/26*   (2006.01)

(52) U.S. Cl. .......... 353/94; 359/707; 359/712; 359/623; 359/196.1

(58) Field of Classification Search .................... 353/94; 362/553, 558, 583; 359/196.1, 707, 712, 359/623, 98
See application file for complete search history.

(56) References Cited

U.S. PATENT DOCUMENTS

| 5,313,479 A | * | 5/1994 | Florence ........................ 372/26 |
| 6,445,487 B1 | * | 9/2002 | Roddy et al. .................. 359/278 |

(Continued)

FOREIGN PATENT DOCUMENTS

| JP | 6-208089 | 7/1994 |
| JP | 10-293268 | 11/1998 |
| JP | 11-64789 | 3/1999 |
| JP | 2003-98476 | 4/2003 |

(Continued)

OTHER PUBLICATIONS

International Search Report issued Sep. 5, 2006 in the International (PCT) Application of which the present application is the U.S. National Stage.

(Continued)

*Primary Examiner* — Georgia Y Epps
*Assistant Examiner* — Bao-Luan Le
(74) *Attorney, Agent, or Firm* — Wenderoth, Lind & Ponack, L.L.P.

(57) ABSTRACT

A laser image display including a laser light source emitting laser light, a beam deflector element for receiving laser light and deflecting its advancing direction, a beam deflecting element control section for controlling the degree of deflection performed by the beam deflector element, an optical integrator for receiving and guiding the deflected laser light to output from its outputting end face, a pseudo surface light source element for scattering the deflected laser light, and a modulation element for receiving and modulating the laser light scattered by the false surface light source element.

13 Claims, 15 Drawing Sheets

U.S. PATENT DOCUMENTS

| | | | |
|---|---|---|---|
| 6,600,590 B2 * | 7/2003 | Roddy et al. | 359/287 |
| 6,625,381 B2 * | 9/2003 | Roddy et al. | 385/147 |
| 7,477,435 B2 * | 1/2009 | Yonekubo et al. | 359/196.1 |
| 7,646,518 B2 * | 1/2010 | Kasazumi | 359/196.1 |
| 2003/0039036 A1 * | 2/2003 | Kruschwitz et al. | 359/707 |
| 2005/0041712 A1 * | 2/2005 | Sato et al. | 372/46 |
| 2006/0227293 A1 * | 10/2006 | Kasazumi et al. | 353/30 |
| 2008/0239498 A1 * | 10/2008 | Reynolds | 359/618 |

FOREIGN PATENT DOCUMENTS

JP 2004-144936 5/2004

OTHER PUBLICATIONS

Patent Cooperation Treaty (PCT) International Preliminary Report on Patentability, issued Jan. 29, 2008 in International Application No. PCT/JP2006/311002.

* cited by examiner

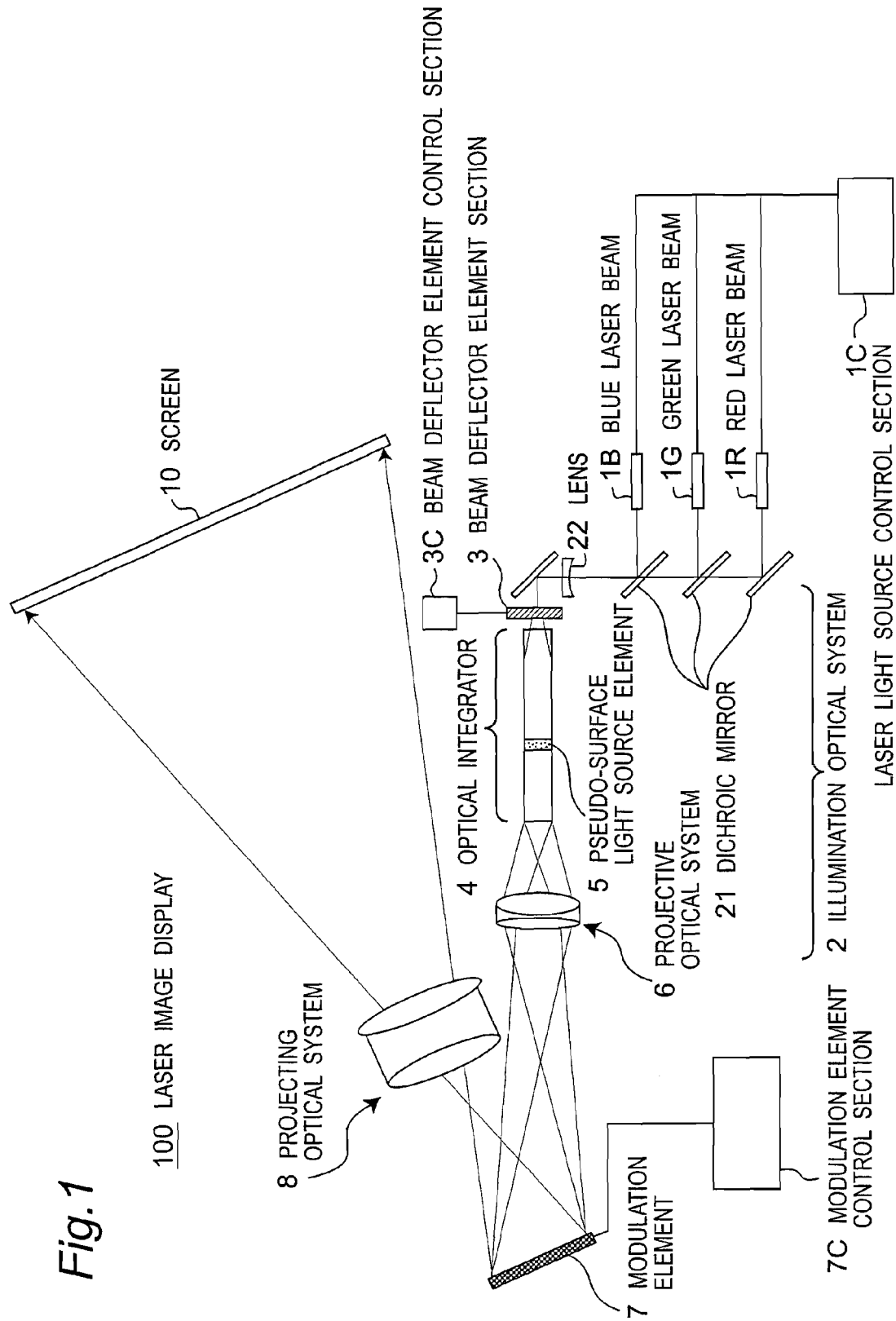

| CONDITION | θ1 | φ1 | [(θ1² + φ1²)]^(1/2)/a | σ/X | power(au) | |
|---|---|---|---|---|---|---|
| 1 | 12 | 5 | 6.50 | 7% | 0.99 | |
| 2 | 16 | 5 | 8.38 | 5% | 0.99 | |
| 3 | 20 | 5 | 10.31 | 4% | 0.98 | |
| 4 | 24 | 5 | 12.26 | 3% | 0.96 | |
| 5 | 28 | 5 | 14.22 | 3% | 0.87 | |
| 6 | 20 | 10 | 11.18 | 3% | 0.95 | |
| 7 | 20 | 20 | 14.14 | 3% | 0.84 | |
| 8 | 12 | 15 | 9.60 | 6% | 0.87 | |
| 9 | 8 | 15 | 8.50 | 7% | 0.88 | |
| 10 | (20) | 5 | | 29% | 0.98 | NO ROTATION OF LENTICULAR LENS |
| 11 | 20 | - | 10.00 | 13% | 1 | NO SURFACE LIGHT SOURCE MEANS |

| 0.7 × tan⁻¹(1/2F) | 1.2 × tan⁻¹(1/2F) |
|---|---|
| 7.92 | 13.57 |

LASER IMAGE DISPLAY, AND OPTICAL INTEGRATOR AND LASER LIGHT SOURCE PACKAGE USED IN SUCH LASER IMAGE DISPLAY

TECHNICAL FIELD

The present invention relates to a laser light source package used in an image display device, an optical integrator for guiding light from a light source, and an image display device such as a television and an image projector. In particular, the present invention relates to a laser light source package being capable of emitting laser light of a plurality of wavelengths, an optical integrator being suitable for the laser light, and a laser image display using them.

BACKGROUND ART

Currently, image display devices of various methods have been proposed. One of the image display method used in such image display devices is a projection display method in which a modulated light source light is projected onto a screen to display an image. Conventionally, the light source employed in the image display device using such method is a lamp light source. However, the lamp light source has problems in its short lifetime, its limited color reproduction region, and low light usage efficiency.

In order to solve the problems in a lamp light source, a laser light source has been recently tested for use as a light source of the projection display. In the present application, an image display device using a laser light source as a light source is referred to as the laser image display. A laser light source, which is used in the laser image display, has longer lifetime than a lamp light source, and is easy to enhance the light usage efficiency for the sake of its strong directivity of laser light. Furthermore, laser light emitted from a laser light source excels in monochromaticity. It enlarges the color reproduction region compared to that by the lamp light source and enables displaying a vivid color image.

However, the laser image display has a problem of speckle noise. Speckle noise is a noise due to high coherency of laser light, which is used for displaying an image. Such problem did not exist in an image display device in which a lamp light source is used. When the laser light having high coherency is scattered on the screen and reaches an observer, the scattered laser light interfere with each other and the observer recognizes microscopic uneven noise. The speckle noise appears as granular noise of a size defined from an F value (F number) of an eye of the observer and a wavelength of the laser light source and is arrayed at random. When the observer viewing an image on the image display screen, the speckle noise inhibits the observer from recognizing the image on the image display screen, and causes serious image degradation. For reducing the speckle noise, various techniques being related to the laser image display method and the laser image display have been proposed.

Patent Document 1 (JP 06-208089 A) discloses a display device equipped with a diffusion element which performs rotational movement. The laser light passed through the diffusion element which performs the rotational movement is used for the illumination of a modulation element in this display device. The diffusion element which performs the rotational movement, in effect, temporally changes an incident angle of the illumination light with respect to the modulation element. Therefore, an incident angle of the laser light with respect to the image display screen also temporally changes, and hence, the speckle pattern generated on the image display screen temporally changes. Consequently, the speckle noise which the observer recognizes is reduced since the observer observes an image in which the speckle pattern is variedly changing and temporally averaged.

Patent Document 2 (JP 10-293268 A) discloses a laser display device equipped with an optical deflector and a fly eye lens. Laser light emitted from a light source enters through the optical deflector the fly eye lens in such laser display device. The fly eye lens forms secondary light sources of the same number as the elements configuring the same. The laser light having exit the secondary light source array enters a spatial modulator, at which an image is formed, and the image is displayed on a screen. Therefore, in this display device, the light source image which illuminates the spatial modulator is a substantially point light source array. It is difficult to sufficiently remove the speckle noise when the light source which forms its light source image like that above mentioned is used as light source.

Patent Document 3 (JP 2003-98476 A) discloses a laser projection type display system equipped with a diffuser and a fly eye (eyes of a fly) integrator, and also proposes an optimum arrangement of the movable diffuser and the fly eye integrator.

Patent Document 4 (JP 2004-144936 A) discloses an image display device in which a diffusion element is arranged between a light source and an illuminated subject body. In such image display device, reduction in speckle noise is achieved by vibrating the diffusion element by means of a vibration applying means connected to the diffusion element. This document also proposes arranging another diffusion means other than the diffusion element.

As mentioned above, it is possible to reduce the speckle noise by moving the diffusion element such as diffuser and the diffuser plate and changing the angle of the illumination light. However, a precise control of the illumination light angle is practically impossible to perform in such configuration. The device having such configuration has a problem in light usage efficiency of the projection optical system for projecting the light emitted from the modulation element on the image display screen.

In the field of the image display device using a laser light source such as a semiconductor laser, a proposal relating to enhancement in light usage efficiency in which a projection optical system with enhanced light usage efficiency is suggested has seldom been proposed.

In the conventional proposal related to the optical system of the display (laser image display) which employs a laser light source, reduction of the speckle noise is centrally focused. Proposals from a standpoint of enhancement of the light usage efficiency in the entire optical system of the device, which includes the projection optical system, are hardly seen in such conventional proposals. A proposal of a technique which achieves both of the two points at a high level, that is, the sufficient speckle noise reducing effect and the ensuring of high light usage efficiency, has not been yet found.

Patent Document 1: JP 06-208089 A
Patent Document 2: JP 10-293268 A
Patent Document 3: JP 2003-098476 A
Patent Document 4: JP 2004-144936 A

SUMMARY OF INVENTION

Problem to be Solved by the Invention

In view of the existing problems, it is an object of the invention of the present application to provide an image display device in which sufficient speckle noise reducing effect and ensuring of high light usage efficiency are both achieved.

Furthermore, it is also an object of the present invention to provide an image display device capable of displaying an image with a uniform brightness in every area, including a peripheral area, of the image display screen.

In order to solve the problems of the present application, the present invention aims to provide an optical integrator which can be advantageously used in the laser image display.

In order to solve the problems of the present application, the present invention aims to provide a laser light source package which can be advantageously used in the laser image display.

Means for Solving Problem

According to one aspect of the present invention, the present invention provides a laser image display which includes: a laser light source which emits a laser light; a beam deflector element section which receives the laser light and deflects an advancing direction of the laser light; a beam deflector element control section which controls an extent of the deflection by the beam deflector element section; an optical integrator which receives and guides the deflected laser light, and emits the laser light from an exit end face; a pseudo-surface light source element which scatters the deflected laser light; and a modulation element which receives and modulates the laser light being scattered by the pseudo-surface light source element.

In the one aspect of the present invention, a shape of the exit end face of the optical integrator preferably has similarity with a shape of an effective surface of the modulation element.

In the one aspect of the present invention, the pseudo-surface light source element is arranged between light guiding parts of the optical integrator along a light path of the laser light.

In the one aspect of the present invention, the pseudo-surface light source element is preferably arranged between the exit end face of the optical integrator and the modulation element along the light path of the laser light.

In the one aspect of the present invention, the beam deflector element control section variably controls the extent of deflection of the beam deflector element section in time series.

In the one aspect of the present invention, the pseudo-surface light source element preferably provides different phases to the laser light depending on at least a position or an incident angle at which the laser light enters.

In the one aspect of the present invention, the beam deflector element section is preferably an element of which deflecting operation on the laser light changes the light path of the laser light to a direction forming an angle θ being between 0 degrees to $\theta_1$ degrees with respect to the optical axis, the pseudo-surface light source element is preferably an element which acts a scattering operation of a half-value scattering angle $\phi_1$ to the laser light which enters with a direction parallel to the optical axis, and the $\phi_1$ and the $\phi_1$ preferably satisfies a relationship of $\theta_1 > \phi_1$.

In the one aspect of the present invention, preferably, the laser image display further includes: a projective optical system, being arranged between the pseudo-surface light source element and the modulation element along the advancing direction of the laser light, which has the received laser light entering the modulation element; and a projecting optical system, being arranged in a downstream of the modulation element along the advancing direction of the laser light, which enlarges the modulated laser light, wherein Equation 1

$$0.7 \times \tan^{-1}\left(\frac{1}{2F}\right) < \frac{1}{a}\sqrt{\theta_1^2 + \phi_1^2} < 1.2 \times \tan^{-1}\left(\frac{1}{2F}\right) \quad (1)$$

is preferably satisfied, where a is a magnification of the projective optical system and F is an F number of the projecting optical system.

In the one aspect of the present invention, the pseudo-surface light source element preferably changes a polarizing direction of the incident laser light entering the pseudo-surface light source element substantially at random.

In the one aspect of the present invention, the pseudo-surface light source element is preferably made of birefringent material having a non-uniform thickness distribution with respect to a direction perpendicular to the optical axis of the optical system in which the pseudo-surface light source element is involved.

In the one aspect of the present invention, the modulation element preferably includes a micro-lens which deflects the laser light entering a pixel contained in the modulation element, in an upstream with respect to the advancing direction of the laser light.

In the one aspect of the present invention, preferably, the laser light source includes a semiconductor laser; the modulation element has the effective surface of a rectangular shape; and a thickness direction of an active layer of the semiconductor laser and a long side direction of the rectangular shape are parallel.

In the one aspect of the present invention, the semiconductor laser preferably has a stripe width of greater than or equal to ten times of the wavelength of the laser light that can emit.

In the one aspect of the present invention, preferably, the laser light source includes a first laser light source unit being capable of emitting a first laser light having a first wavelength and a second laser light source unit being capable of emitting a second laser light having a second wavelength longer than the first wavelength; and a light path length to the modulation element of the first laser light is shorter than a light path length to the modulation element of the second laser light.

According to another aspect of the present invention, the present invention provides an optical integrator which includes an optical integrator upstream part and an optical integrator downstream part which guide laser light, and a pseudo-surface light source element which scatters the laser light; wherein the pseudo-surface light source element is arranged so as to be sandwiched by a light guiding part of the optical integrator upstream part and a light guiding part of the optical integrator downstream part.

In the another aspect of the present invention, a shape of an end face of the optical integrator downstream part being capable of emitting the laser light and being a face on the opposite side to the end face which is proximate to the pseudo-surface light source element, which an optical axis of the optical integrator downstream part passes through and is a portion being capable of emitting the guided laser light, preferably has a rectangular shape having substantially a horizontal to vertical ratio of 4:3.

In the another aspect of the present invention, a shape of an end face of the optical integrator downstream part being capable of emitting the laser light and being a face on the opposite side to the end face which is proximate to the pseudo-surface light source element, which an optical axis of the optical integrator downstream part passes through and is a portion being capable of emitting the guided laser light, preferably has a rectangular shape having substantially a horizontal to vertical ratio of 16:9.

According to further another aspect of the present invention, the present invention provides a laser light source package which includes a first laser light source unit being capable of emitting a first laser light having a first wavelength and a second laser light source unit being capable of emitting a second laser light having a second wavelength which is shorter than the first wavelength; wherein the first laser light source unit is a semiconductor laser light source having a first stripe width, the second laser light source unit is a semiconductor laser light source having a second stripe width, the first stripe width has a length of greater than or equal to ten times of the first wavelength, and the second stripe width has a length of greater than or equal to ten times of the second wavelength.

In the further another aspect of the present invention, the first stripe width is preferably longer than the second stripe width.

Effects of the Invention

The image display device according to the present invention can display an image with high light usage efficiency in which speckle noise is removed.

The image display device according to the present invention can display an image with a uniform brightness in every area, including a peripheral area, of the image display screen.

The optical integrator according to the present invention can provide an illumination light of uniform brightness to the modulation element with high light usage efficiency. Furthermore, the speckle noise is reduced in the image being projected through the optical integrator according to the present invention.

BRIEF DESCRIPTION OF DRAWINGS

FIG. 1 is a configuration diagram of a laser image display according to a first embodiment of the present invention.

FIG. 8 is a diagram of a result of image quality evaluation of the laser image display.

Figure 2A:
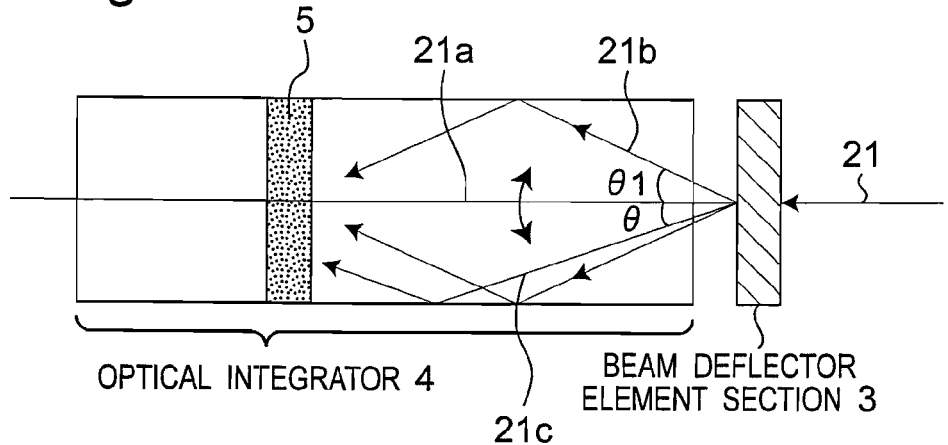
FIG. 2A is a diagram of operations of a beam deflector element section and an optical integrator.

EXPLANATIONS OF LETTERS AND NUMERALS 1R red laser light source
1G green laser light source 1B blue laser light source
1C laser light source control section
2 illumination optical system
3 beam deflector element section
3a lenticular lens array
3b lenticular lens array
3c variant of a lenticular lens array
3C beam deflector element control section
3M vibration mirror
4 optical integrator
5 pseudo-surface light source element
6 projective optical system
7 modulation element
7C modulation element control section
8 projecting optical system
10 screen
21 dichroic mirror
22 lens
41 transparent adhesive
55 incident end face of optical integrator
57 exit end face of optical integrator
59 side face of optical integrator
71 hollow motor
100 laser image display
200 laser image display
202 illumination optical system
206 projective optical system
208 projecting optical system
209 dichroic prism
210 screen
261 mirror
262 field lens
271 two-dimensional optical modulation element with microlens array
1101 active layer
1103 stripe
1401 multi-rod integrator
1403 birefringence pseudo-surface light source element
1405 lens array formed on multi-rod integrator 1401

DETAILED DESCRIPTION OF THE INVENTION

The embodiments of the present invention will now be described with reference to the drawings.

First Embodiment

The first embodiment of the present invention is a laser image display. The laser image display is a projection display (laser display). FIG. 1 is a schematic configuration diagram of the laser image display 100 according to the first embodiment.

The laser image display 100 includes laser light sources of three colors of red (R) laser light source 1R, green (G) laser light source 1G, and blue (B) laser light source 1B; a laser light source control section 1C which performs drive control of the laser light sources 1R, 1G, and 1B; a dichroic mirror 21 which reflects or transmits the laser light; a lens 22 (e.g., diverging lens); a beam deflector element section 3 which deflects the advancing direction of the laser light; a beam deflector element control section 3C which drives and controls the beam deflector element section 3; an optical integrator 4 which guides the laser light; a pseudo-surface light source element 5 which is preferably configured inside the optical integrator 4 or arranged so as to be sandwiched by the portions of the optical integrator 4; a projective optical system 6 which has a magnification a and projects the laser light to a modulation element 7; the modulation element 7 which modulates the laser light and forms an image; a modulation element control section 7C which drives and controls the modulation element 7; a projecting optical system 8 which has an F number (F value) F and projects the laser light emitted from the modulation element 7 onto a screen 10; and the screen 10 which displays the image. The pseudo-surface light source element 5 may be arranged being separate from the optical integrator 4 and between the optical integrator 4 and the modulation element 7 with respect to the advancing direction of the laser lights from the laser light sources 1R, 1G, and 1B.

In the laser image display 100, a single modulation element 7 is used in a time division manner in synchronization with the emission timing of each color laser light to modulate the laser light from each laser light source 1R, 1G, and 1B. The laser light source control section 10 can drive and control the laser light sources 1R, 1G, and 1B so that the laser light sources 1R, 1G, and 1B sequentially emit the laser in time series. The laser lights of three colors including R (red), G (green), and B (blue) exit from the laser light sources 1R, 1G, and 1B are respectively guided to the lens 22 (diverging lens) and the like through one or more dichroic mirror 21. The dichroic mirror 21 can appropriately wave-combine the laser lights of three colors to modulate the laser lights of three colors with one modulation element 7. The laser light of three colors then enter the beam deflector element section 3 being involved in an illumination optical system 2 of the laser image display 100.

The illumination optical system 2 is an optical system which receives the laser lights from the laser light sources 1R, 1G, and 1B, changes such laser lights to a laser light having a substantially uniform light intensity distribution at a cross section and having a predetermined cross sectional shape, and emits the laser light. In the illumination optical system 2 of the laser image display 100, the laser light having a predetermined cross sectional shape and a uniform light intensity distribution is emitted from the projective optical system 6 and illuminates the modulation element 7. The components involved in the illumination optical system 2, and details of the operations and effects thereof will be hereinafter described.

The modulated laser light reflected after being subjected to modulation in the modulation element 7 is enlarged and projected onto the screen 10 by the projecting optical system 8, and the modulated laser light of each color is additively mixed in a temporally averaged manner on the screen 10 thereby forming a color image on the screen 10. The observer observes the formed colorful color image. A reflective two-dimensional modulation element such as digital micro-mirror device (DMD) may be used for the modulation element 7 of the laser image display 100. However, the present invention does not limit the modulation element 7 to the reflective two-dimensional modulation element. The present invention can use various types of modulation element. For instance, the present invention may use a transmissive modulation element for the modulation element 7. The present invention may also use a one-dimensional modulation element for the modulation element 7. Furthermore, the present invention does not limit the modulation element 7 from being configured by a single element, and may be configured using a plurality of modulation elements. In this case, the laser image display 100 may include the modulation element for every laser light from the laser light sources 1R, 1G, and 1B. The present invention does not exclude the use of the laser light temporally and successively emitted from at least one of the laser light sources 1R, 1G, or 1B.

<Illumination Optical System 2>

The illumination optical system 2 of the laser image display 100 will now be described in detail.

<Configuration of Illumination Optical System 2>

The illumination optical system 2 of the laser image display 100 includes the beam deflector element section 3, the optical integrator 4, the pseudo-surface light source element 5, and the projective optical system 6.

<<Beam Deflector Element Section 3>>

The beam deflector element section 3 is arranged in the upstream of the optical integrator 4 with respect to the advancing direction of the laser lights from the laser light sources 1R, 1G, and 1B, and includes an element having a function of receiving the laser light emitted from at least one of the laser light sources 1R, 1G, and 1B and deflecting the advancing direction thereof. The beam deflector element control section 3C controls the extent (corresponding to beam deflection angle to be hereinafter described) of the deflecting operation which the laser light entering the beam deflector element section 3 is subjected to so as to be changed as needed. The laser light which advancing direction is deflected towards a predetermined direction by the beam deflector element section 3 enters the optical integrator 4 arranged in the downstream of the optical integrator 4 with respect to the advancing direction.

<<Optical Integrator 4>>

The laser light from the laser light source is subjected to the deflecting operation by the beam deflector element section 3, and enters the optical integrator 4. The optical integrator 4 has an incident end face of a predetermined shape and an exit end face of a predetermined shape, and guides the laser light, which has entered, to the exit end face while tolerating internal reflection at internal boundary surfaces of the optical integrator 4. The shape of the incident end face of the optical integrator 4 may be an arbitrary shape, but is preferably configured to facilitate retrieval of the laser light emitted from the beam deflector element section 3 and to have the retrieved amount being as large as possible. Similarly, the shape of the exit end face of the optical integrator 4 may be an arbitrary shape, but preferably has a rectangular shape. More preferably, the exit end face shape of the optical integrator 4 is in a similarity relationship with the shape of a region where the element related to modulation for image formation is actually arranged in the modulation element 7, that is, a region of the modulation element to be irradiated with the laser light for image display. Alternatively, a similarity relationship with the shape of the image actually formed on the screen 10 is preferably achieved. The amount of laser light that does not actually contribute to the image formation of the laser light illuminating the modulation element 7 can be suppressed to a minimum by providing a similarity relationship to the exit end face of the optical integrator 4. For instance, if the region of the modulation element 7 of the laser image display 100 has a rectangular shape with a horizontal to vertical ratio of 4:3, the exit end face shape of the optical integrator 4 will also preferably have a rectangular shape with a horizontal to vertical ratio of 4:3. Alternatively, if the laser image display 100 is designed to display the image of a rectangular shape having a horizontal to vertical ratio of 4:3, the shape of the exit end face of the optical integrator 4 is preferably designed to a rectangular shape having a horizontal to vertical ratio of 4:3. The optical system is desirably configured so that such region of the modulation element 7 and the laser light illuminating the same coincide. The shape of the side face of the optical integrator 4 may have an arbitrary shape, but preferably has a shape that allows internal reflection to be appropriately and efficiently performed, and the incident laser light to be guided to the exit end face at high efficiency. When using an element for performing polarization control such as liquid crystal for the modulation element 7, the side face shape is desirably formed so that the internal boundary surface (reflecting surface) for performing the internal reflection becomes perpendicular to or parallel to the polarizing direction of the incident laser light. If the shapes of the incident end face and the exit end face of the optical integrator 4 are different, the side face shape may have a flat plane or a curved plane non-parallel with respect to the optical axis of the illumination optical system 2. A shape that bends the optical axis in the optical integrator 4 may also be adopted.

<Pseudo-Surface Light Source Element 5>>

The pseudo-surface light source element 5 itself is an element for scattering and emitting the incident laser light. Generally, the laser light is a parallel light. The pseudo-surface light source element 5 changes the incident parallel laser light to a substantially diverged light by scattering operation of the pseudo-surface light source element 5. The pseudo-surface light source element 5 merely needs to be arranged in the downstream from one portion of the optical integrator 4 with respect to the advancing direction of the laser light. According to such configuration, the pseudo-surface light source element 5 can apply the scattering operation on the laser light guided through a light guiding part of the optical integrator 4 in the laser image display 100. The light guiding part of one portion of the optical integrator 4 being arranged closer to the upstream than the pseudo-surface light source element 5 is preferably longer than a predetermined length along the optical axis. The predetermined length is substantially the same as a minimum value of the length necessary for the laser light to be guided through the optical integrator 4 to uniformly enter the pseudo-surface light source element 5.

The pseudo-surface light source element 5 is preferably arranged proximate to the light guiding part of the optical integrator 4 at the upstream side part and the downstream side part along the advancing direction of the laser light. The term "proximate" includes a state in which the respective one part are contacting each other, a state of being connected through adhesive or the like, a state of being separated from each other but having sufficiently close positional relationship, and the like. In this case, the pseudo-surface light source element 5 is arranged so that its both sides are sandwiched by the proximate optical integrator 4. The term "sandwich" includes a case where one portion not including the edge of the optical integrator 4 has a function of the pseudo-surface light source element 5 and a case where the pseudo-surface light source element 5 is inserted to the inside of the optical integrator 4. In other words, the term "sandwich" includes a state in which the light guiding part of the optical integrator 4, the pseudo-surface light source element 5, and the light guiding part of the optical integrator 4 are arranged in order proximate to each other along the advancing direction of the laser light. The length of the light guiding part of the last half of the optical integrator 4 positioned in the downstream side of the pseudo-surface light source element 5 along the light path of the laser light is preferably longer than or equal to a predetermined length. The length is defined by measuring a distance along the optical axis of the illumination optical system 2. The predetermined length differs depending on the configuration of the pseudo-surface light source element 5, but substantially matches the minimum value of the length necessary for the image of the element 5 to disappear from the image of the exit end face of the optical integrator 4. The pseudo-surface light source element 5 may be arranged being separate from the optical integrator 4 between the optical integrator 4 and the projective optical system 6 with respect to the advancing direction of the laser lights from the laser light sources 1R, 1G, and 1B. If the optical integrator 4 is a hollow optical integrator as hereinafter described, the light guiding part of the optical integrator 4 substantially matches the hollow part.

<<Projective Optical System 6>>

The projective optical system 6 is an optical system for projecting the laser light exit from the optical integrator 4 onto the modulation element 7. The projective optical system 6 is an optical system having a magnification a that can be configured with one lens or one or more lens group so that the laser light exit from the optical integrator 4 appropriately enters the modulation element 7. The projective optical system 6 may be configured as an anamorphic system. In this case, the projective optical system 6 is an optical system that distorts the laser light emitted from the exit end face of the optical integrator 4, and guides the distorted laser light to an effective surface of the modulation element 7. In this case, the shape of the exit end face of the optical integrator 4 is designed in view of the distortion of the laser light by the projective optical system 6.

<<Operations and Effects of Illumination Optical System 2>>

Figure 2B:
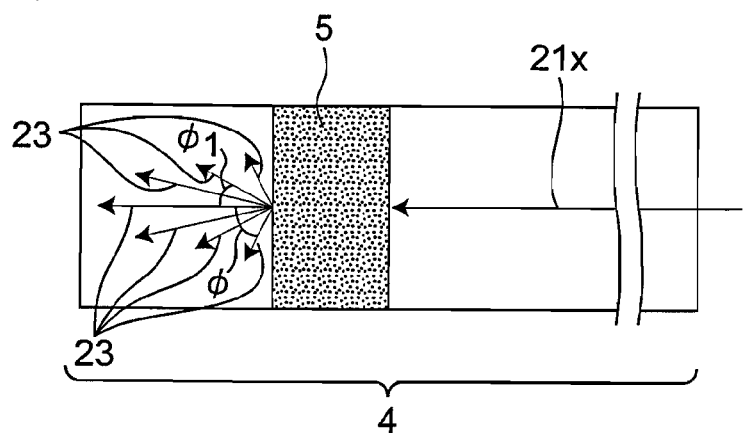
FIG. 2B is a diagram of operations of a pseudo-surface light source element.
Figure 2C:
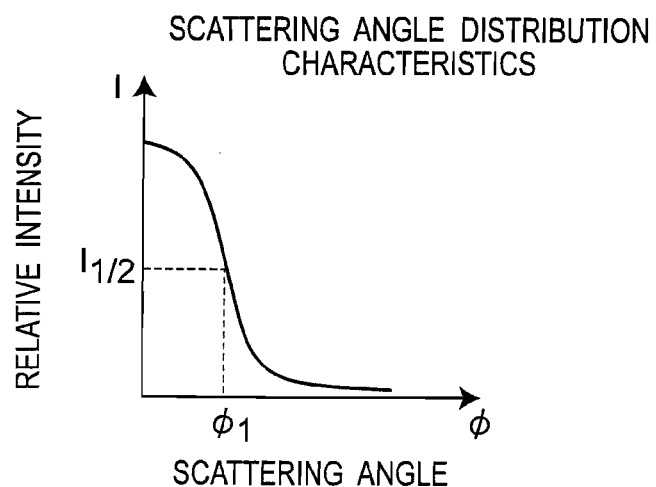
FIG. 2C is a diagram of scattering angle distribution characteristics of the pseudo-surface light source element.

The operations and effects of the illumination optical system 2 will now be described in detail. FIGS. 2A, 2B, and 2C are diagrams describing the operations of the optical integrator 4 and the pseudo-surface light source element 5. First, FIG. 2A is a diagram showing a state in which laser light $21c$ and the like that has entered the optical integrator 4 is propagated through the optical integrator 4.

<<Operation of Illumination Optical System 2>>

In the laser image display 100 according to the present invention, the laser light subjected to the deflecting operation with respect to the advancing path by the beam deflector element section 3 enters the optical integrator 4.

The incident laser light $21c$ enters the optical integrator 4 with an angle θ with respect to an optical axis $21a$. The optical axis $21a$ is the optical axis of the illumination optical system 2. The angle θ is the beam deflection angle of the beam deflector element section 3. The beam deflection angle θ is an angle formed by a light path formed when the laser light 21 parallel to the optical axis $21a$ is subjected to the deflecting operation by the beam deflector element section 3 and the optical axis $21a$. The beam deflection angle θ satisfies the relationship $0 \leq |θ| θ_1$. $θ_1$ is a maximum beam deflection angle and is a maximum value of the beam deflection angle θ formed when the laser light 21 parallel to the optical axis $21a$ is subjected to the deflecting operation by the beam deflector element section 3 and then exit. The beam deflection angle can be controlled in real time between 0 degrees and $θ_1$ degrees through the beam deflector element control section 3C. The controlling method will be hereinafter described using examples.

Therefore, the laser light enters the optical integrator 4 at various beam deflection angles θ ($θ:0 \leq |θ| θ_1$), and is propagated to the left of the drawing while being reflected at the internal boundary surface in the optical integrator 4. During propagation, one part of the incident laser light repeats the internal reflection over a plurality of times at the internal boundary surface thereby enlarging the beam shape, and ultimately becoming the beam shape that substantially matches a cross section of the light guiding part of the optical integrator 4 and filling the optical integrator 4.

In this case, the light source image of the laser light guided through the optical integrator 4 is an image made up of a plurality of point light sources of the same number as the number of times the laser light is internally reflected in the optical integrator 4 at the cross section of the light guiding part of the optical integrator 4.

The laser light that has become the shape filling the light guiding part of the optical integrator 4, that is, the laser light having a light source image made up of a plurality of point light source groups then enters the pseudo-surface light source element 5.

The operation of the pseudo-surface light source element 5 will now be described with reference to FIGS. 2B and 2C. FIG. 2B is a diagram showing a scattering operation on the incident laser light by the pseudo-surface light source element 5.

The pseudo-surface light source element 5 applies the scattering operation on the laser light being incident thereto, and emits the incident laser light at various scattering angles and at a predetermined intensity distribution dependent on the scattering angle. When the light entering the pseudo-surface light source element 5 is parallel light, the light to be emitted exits the element 5 as diverging light having a predetermined intensity distribution.

When the laser light that has become the shape filling the light guiding part of the optical integrator 4, that is, the laser light having a light source image consisting of a plurality of point light source groups enters the pseudo-surface light source element 5, this laser light is changed to a substantially diverging light having a light source image including a surface light source indicating a substantially uniform light intensity distribution. The laser light is again guided through the optical integrator 4 while being internally reflected, and then exits the optical integrator 4 as a laser light having substantially the same shape as the shape of the exit end face of the optical integrator 4 and having a uniform light intensity distribution.

FIG. 2C is a view describing the definition of a half-value scattering angle $φ_1$ quantitatively indicating the extent of the pseudo-surface light source operation (scattering operation) of the pseudo-surface light source element 5. The half-value scattering angle $φ_1$ is defined as an angle formed by the propagating direction of the laser light having a half-value ($I_{1/2}$) of a maximum light intensity of the diverging laser light exit from the other end when the parallel laser light $21x$ (FIG. 2B) parallel to the optical axis $21a$ (FIG. 2A) enters the pseudo-surface light source element 5 and the optical axis $21a$ (light path of parallel laser light $21x$).

The pseudo-surface light source element 5 desirably includes an element that provides different phases to the incident laser light depending on at least one of the position or the incident angle the laser light enters and transmits through, and emits the laser light. As the pseudo-surface light source element 5 provides different phases to the incident laser light depending on at least one of the incident position or the incident angle of the laser light, the laser light flux exiting from the pseudo-surface light source element 5 will have a non-planar and a complex phase plane, and thus coherency of the laser light flux will be reduced. In this case, the exit end face of the pseudo-surface light source element 5 emitting the laser light flux configures the pseudo-surface light source, and the laser light having different phases is emitted in a diverging manner at various angles from various positions of the cross section.

The light source image of the laser light emitted from the pseudo-surface light source element 5 and emitted from the optical integrator 4 can be observed at an exit pupil of the projective optical system 6.

The pseudo-surface light source processed laser light flux having uniform light intensity and reduced coherency is emitted from the projective optical system 6 towards the modulation element 7 and modulated in the modulation element 7, so that the modulated laser light flux reaches the screen 10 in an enlarged form by the projecting optical system 8 thereby forming an image.

<<Effect of Illumination Optical System 2>>

The light source image of the laser light emitted from at least one of the laser light sources 1R, 1G, and 1B first becomes the light source image consisting of a plurality of point light sources, which configuration temporally changes, by the deflecting operation in which extent of operation of the beam deflector element section 3 temporally changes and the effect of internal reflection formed when light guided through the upstream part of the optical integrator 4. According to the operation of the pseudo-surface light source element 5 and the optical integrator downstream part, the light source image consisting of a plurality of point light sources becomes a pseudo-surface light source processed light source image. The pseudo-surface light source processed laser light flux is configured by a plurality of substantially diverging laser lights which main advancing direction is temporally changed in correspondence to change in the temporally changing plurality of point light source images.

Thus, the modulation element 7 is illuminated by the laser light of which incident angle temporally changes. The speckle pattern produced on the screen 10 changes according to the temporal change of the incident angle of the laser light configuring the laser light flux illuminating the modulation element 7. The speckle noise is averaged at the vision of the observer and the speckle noise recognized by the observer is reduced by driving and controlling the beam deflector element section 3 so as to cause angle variation sufficiently faster than the time required for the observer to recognize the speckle pattern. Thus, the observer recognizes the image displayed on the screen 10 as a clear image free of speckle noise.

Furthermore, the pseudo-surface light source processed light source image has the light source image area enlarged far greater than the light source image consisting of a plurality of point light sources. In the laser image display 100, the enlargement of the light source image area of the laser light with respect to image display corresponds to enlargement of the effective light source area displaying each pixel configuring the image on the screen 10. Generally, the enlargement of the effective light source area of the light source with respect to display of each pixel lowers the contract of the speckle noise pattern. In the laser image display 100, the speckle noise recognized by the observer is further reduced due to synergistic effect with the speckle noise reducing effect by temporal change of the light source image described above.

The laser image display 100 according to the present invention efficiently removes speckle noise by synergistic effect of two effects of temporally averaging the speckle noise and lowering the contrast of the speckle noise pattern through enlargement of the effective light source area.

Furthermore, majority of the laser light flux emitted from the exit end face of the optical integrator 4 can be used for image display by having the exit end face of the optical integrator 4 (exit end face on the optical integrator 4 downstream part) as the shape of similarity to the shape of the modulation element 7, thereby enhancing the light usage efficiency of the laser image display 100.

<Configuration Examples>

The pseudo-surface light source element 5 is preferably formed in the optical integrator. Alternatively, it is preferably arranged in the upstream of the modulation element 7. Here, "upstream of modulation element 7" refers to the zone from the exit end face of the optical integrator 4 up to the modulation element 7 which modulates the laser light flux. The light source image of the laser light flux for illuminating the modulation element 7 can be made to one continuous image instead of a collection of plurality of point light sources by arranging the pseudo-surface light source element within the relevant zone. The light source image of the illumination laser light flux is formed to a substantially continuous image by arranging the pseudo-surface light source element 5 at a position where the cross sectional shape of the laser light flux has a rectangular shape similar to the modulation element 7 or a substantially diverging laser light flux. However, when arranging the pseudo-surface light source element 5 in the upstream of the modulation element 7, it is preferably spaced apart from the exit end face of the optical integrator by greater than or equal to 1 mm so that the image resulting from the pseudo-surface light source element 5 does not image on the modulation element 7.

The pseudo-surface light source element 5 is preferably arranged closer to the downstream than a position at where the laser light that has entered the optical integrator 4 fills the entire light guiding part of the optical integrator 4.

Figure 3A:
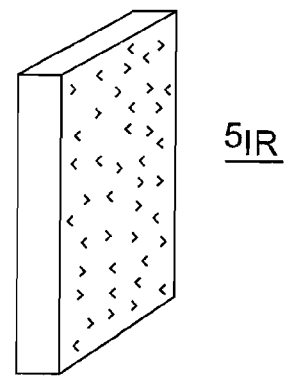
FIG. 3A is a diagram of a pseudo-surface light source element having a random concave-convex pattern on its surface.
Figure 3B:
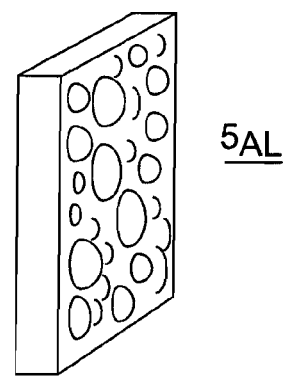
FIG. 3B is a diagram of a pseudo-surface light source element including a micro-lens array.
Figure 3C:
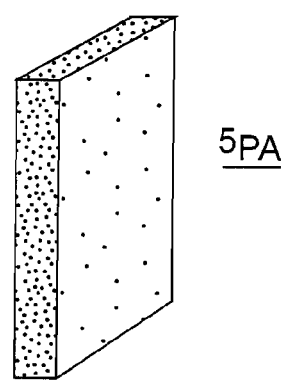
FIG. 3C is a diagram of a pseudo-surface light source element including particles having an index of refraction different from that of a base material in a scattered manner.

FIGS. 3A, 3B, and 3C are diagrams showing a configuration example of the pseudo-surface light source element 5. The pseudo-surface light source element includes a pseudo-surface light source element 5IR (FIG. 3A) having a random concave-convex pattern on the surface, a pseudo-surface light source element 5AL (FIG. 3B) including a micro-lens array formed with various types of lenses, and a pseudo-surface light source element SPA (FIG. 3C) including particles having an index of refraction different from the base material in a scattered manner. The pseudo-surface light source element 5 can be used as a reflective element by being attached to a mirror and the like.

Furthermore, the pseudo-surface light source element 5 is preferably subjected to anti-reflection treatment corresponding to the wavelength of the laser light to prevent loss in amount of laser light transmitting therethrough. Anti-reflection coating is preferably performed when arranged in the upstream of the modulation element 7. Moreover, the pseudo-surface light source element 5 preferably uses a hologram diffuser having a hologram pattern to control the half-value scattering angle $\phi_1$. The pseudo-surface light source element 5 may present a non-uniform half-value scattering angle $\phi_1$ at a cross section perpendicular to the optical axis.

The loss in amount of light due to imaging distortion on the modulation element 7 caused by the scattering operation of the pseudo-surface light source element 5 can be eliminated by arranging the pseudo-surface light source element 5 so as to be sandwiched by the optical integrator 4 as shown in FIG. 1. The preferred embodiment as shown in FIG. 1 will now be described. FIGS. 4A, 4B, 4C, 4D, and 4E are diagrams showing specific configuration examples of the pseudo-surface light source element 5 sandwiched by the optical integrator 4.

Figure 4A:
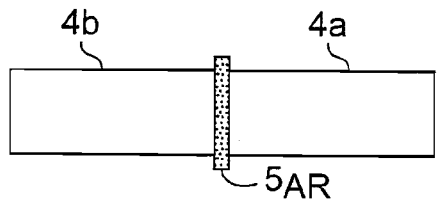
FIG. 4A is a diagram of a specific example of an optical integrator configured by sandwiching the pseudo-surface light source element.

Specific example 1: The pseudo-surface light source element 5AR performed with anti-reflection coating having substantially the same shape as the downstream end face of an optical integrator upstream part 4a and the upstream end face of an optical integrator downstream part 4b is closely attached and fixed so as to be sandwiched by two cross sections of the optical integrator (FIG. 4A).

Figure 4B:
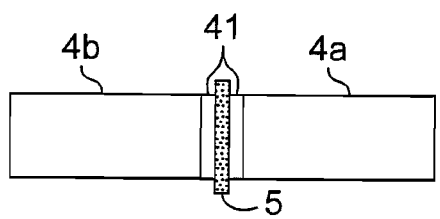
FIG. 4B is a diagram of a specific example of the optical integrator configured by sandwiching the pseudo-surface light source element.

Specific example 2: The pseudo-surface light source element 5 having substantially the same shape as the downstream end face of the optical integrator upstream part 4a and the upstream end face of the optical integrator downstream part 4b is adhered to two cross sections 4a and 4b of the optical integrator with transparent adhesive 41 (FIG. 4B).

Figure 4C:
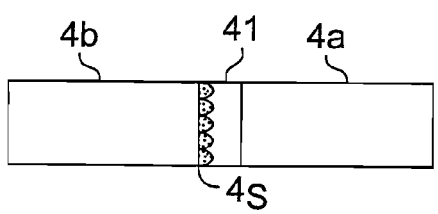
FIG. 4C is a diagram of a specific example of the optical integrator configured by sandwiching the pseudo-surface light source element.

Specific example 3: A concave-convex shape is provided to the cross section of the optical integrator downstream part 4b (or optical integrator upstream part 4a), and a portion 4S having a function similar to the pseudo-surface light source element is formed at the optical integrator 4b (or 4a) and adhered to the optical integrator upstream part 4a (or 4b) with a transparent adhesive 41 (FIG. 4C).

Figure 4D:
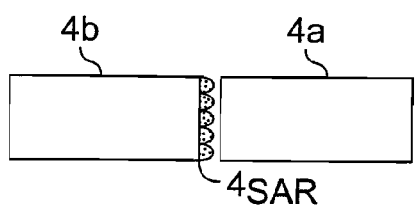
FIG. 4D is a diagram of a specific example of the optical integrator configured by sandwiching the pseudo-surface light source element.

Specific example 4: A concave-convex shape is provided to the cross section of the optical integrator downstream part 4b (or optical integrator upstream part 4a), anti-reflection coating is performed on the concave-convex shape, a portion 4SAR having a function similar to the pseudo-surface light source element is formed in the optical integrator 4b (or 4a) and is closely attached and fixed to the anti-reflection coated optical integrator upstream part 4a (or 4b) (FIG. 4D).

Figure 4E:
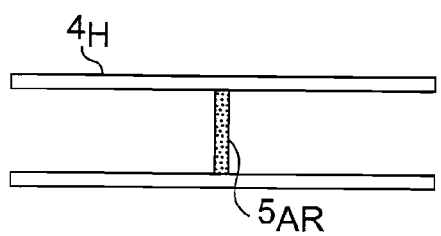
FIG. 4E is a diagram of a specific example of the optical integrator configured by sandwiching the pseudo-surface light source element.

Specific example 5: An anti-reflection coated pseudo-surface light source element 5AR is inserted inside the hollow optical integrator 4H (FIG. 4E).

The configuration of the pseudo-surface light source element 5 is not limited to the above configurations as long as it can be arranged so as to be sandwiched by the optical integrator. Furthermore, when the pseudo-surface light source element 5 is arranged so as to be sandwiched by the optical integrator, the projective optical system 6 made up of lens and the like may be omitted and the image of the exit end face of the optical integrator 4 may be directly formed on the modulation element 7. In this case, the optical integrator 4 and the modulation element 7 are made proximate to each other, and the modulation element 7 is illuminated with emitted laser light from the exit end face of the integrator 4 or the modulation element 7 is illuminated with emitted laser light by field lens.

The optical integrator 4 may use a rod integrator made of a rod-shaped glass, a hollow integrator, or an optical fiber or a hollow fiber having a rectangular exit part. The incident end face and the exit end face of the optical integrator 4 are preferably performed with anti-reflection coating to prevent loss in amount of light by reflection, or are hollow type. FIGS. 5A, 5B, 5C, 5D, 5E, 5F, 5G, 5H, 5I, 5J, 5K, 5L, 5M, 5O, 5P, and 5Q are diagrams describing an example of the shapes of the incident end face, the exit end face, and the side face of the optical integrator 4.

Figure 5A:
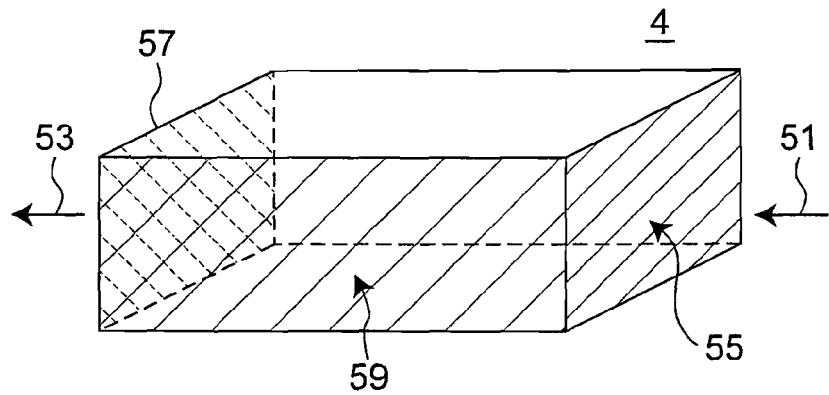
FIG. 5A is a diagram describing a surface of the optical integrator.
Figure 5B:
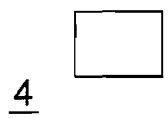
FIG. 5B is a plan view of an incident end face or an exit end face of the optical integrator.
Figure 5C:
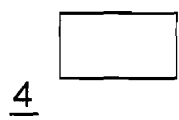
FIG. 5C is a plan view of the incident end face or the exit end face of the optical integrator.

Referring to FIG. 5A, the laser light 51 enters the optical integrator 4 at the incident end face 55, and the laser light 53 exits from the exit end face 57. The incident end face 55 and the exit end face 57 represent the shapes in plan view from an optical axis direction, and the side face shape 59 represents the shape in plan view from a direction perpendicular to the optical axis of the outer surface of the optical integrator 4 connecting the incident end face 55 and the exit end face 57.

At least one of either the incident end face 55 or the exit end face 57 is rectangular, for example, a rectangle having a horizontal to vertical ratio of 4:3 (FIG. 5B), a rectangle having a horizontal to vertical ratio of 16:9 (FIG. 5C), or a rectangle having an appropriate horizontal to vertical ratio. The horizontal to vertical ratio includes 1:1 (square). The incident end face 55 and the exit end face 57 desirably have congruent or similar shapes to each other in order to suppress the manufacturing cost of the optical integrator 4. The end faces 55 and 57 desirably have a shape including parallel sides. A magnitude relationship of the incident end face 55 and the exit end face 57 is arbitrary, but the loss of laser light is suppressed to a minimum by having the incident end face 55 larger than the exit end face 57.

Figure 5D:
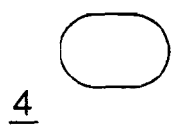
FIG. 5D is a plan view of the incident end face or the exit end face of the optical integrator.

At least one of either the incident end face 55 or the exit end face 57 may have a shape including curved lines such as a shape in which semi-circles are connected with a linear line (FIG. 5D). The laser light can be efficiently retrieved with an end face having a shape corresponding to the beam shape (including beam shape formed when the laser lights from different light sources are wave-combined) of the laser light entering the optical integrator 4.

Figure 5E:
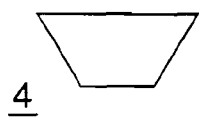
FIG. 5E is a plan view of the incident end face or the exit end face of the optical integrator.

At least one of either the incident end face 55 or the exit end face 57 may have a trapezoidal shape (FIG. 5E).

Figure 5F:
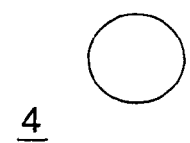
FIG. 5F is a plan view of the incident end face or the exit end face of the optical integrator.

At least one of either the incident end face 55 or the exit end face 57 may have an elliptical (including perfect circle) shape (FIG. 5F).

Figure 5G:
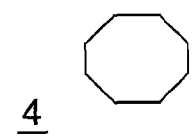
FIG. 5G is a plan view of the incident end face or the exit end face of the optical integrator.

At least one of either the incident end face 55 or the exit end face 57 may have a polygonal shape including five or more vertexes such as octagonal shape (FIG. 5G).

Figure 5H:
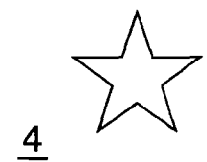
FIG. 5H is a plan view of the incident end face or the exit end face of the optical integrator.

At least one of either the incident end face 55 or the exit end face 57 may have a polygonal shape including one or more vertex angle exceeding 180 degrees such as a star shape (FIG. 5H).

Figure 5I:
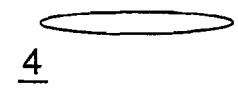
FIG. 5I is a plan view of the incident end face or the exit end face of the optical integrator.

At least one of either the incident end face 55 or the exit end face 57 may have a substantially one-dimensional elliptical shape in which the horizontal to vertical ratio differs extremely (FIG. 5I).

Figure 5J:
FIG. 5J is a plan view of the incident end face or the exit end face of the optical integrator.

At least one of either the incident end face 55 or the exit end face 57 may have a substantially one-dimensional rectangular shape in which the horizontal to vertical ratio differs extremely (FIG. 5J). At least one of either the incident end face 55 or the exit end face 57 may have a rectangular shape in which the horizontal to vertical ratio is substantially $1:\infty$, that is, substantially a line.

Figure 5K:
FIG. 5K is a plan view of the incident end face of the optical integrator.

The incident end face 55 may have a shape in which two or more ellipses (include perfect circle) are one-dimensionally connected (FIG. 5K).

Figure 5L:
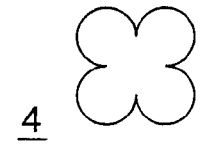
FIG. 5L is a plan view of the incident end face of the optical integrator.

The incident end face 55 may have a shape in which three or more ellipses (include perfect circle) are two-dimensionally connected (FIG. 5L).

Furthermore, a reflection coating may be arranged at one part of the incident end face 55. This prevents entering of unnecessary light, or enables the use of the laser light moving backward through the integrator 4 by reflecting the laser light towards the exit end face 57 side.

The side face shape 59 is not particularly limited, but desirably has a shape of efficiently light guiding the laser light to the exit end face side through internal reflection in the optical integrator 4.

Figure 5M:
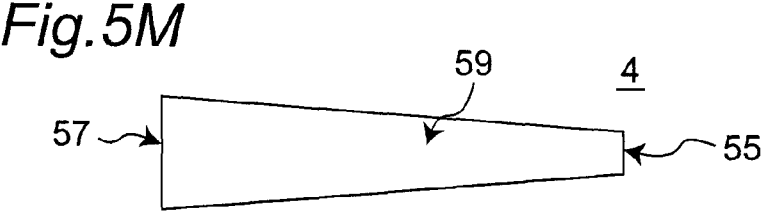
FIG. 5M is a plan view of a side face of the optical integrator.

The side face shape 59 may have a trapezoidal shape (FIG. 5M).

Figure 5N:
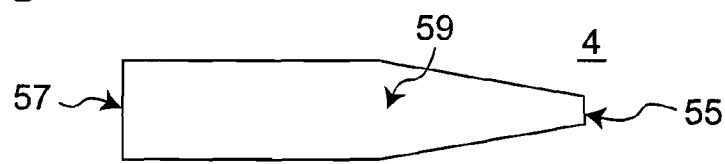
FIG. 5N is a plan view of the side face of the optical integrator.

The side face shape 59 may have a shape of enlarging from the incident end face 55 to the intermediate part of the optical integrator 4, and thereafter being parallel up to the exit end face 57 (FIG. 5N).

Figure 5O:
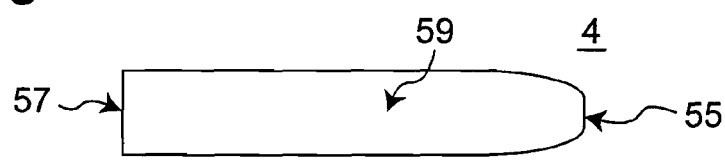
FIG. 5O is a plan view of the side face of the optical integrator.

The side face shape 59 may have a shape of non-linearly enlarging from the incident end face 55 to the intermediate part of the optical integrator 4 (FIG. 5O).

Figure 5P:
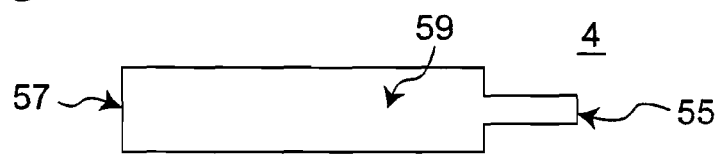
FIG. 5P is a plan view of the side face of the optical integrator.

The side face shape 59 may have a shape in which the width drastically changes at substantially one point of the intermediate part of the optical integrator 4 (FIG. 5P).

Figure 5Q:
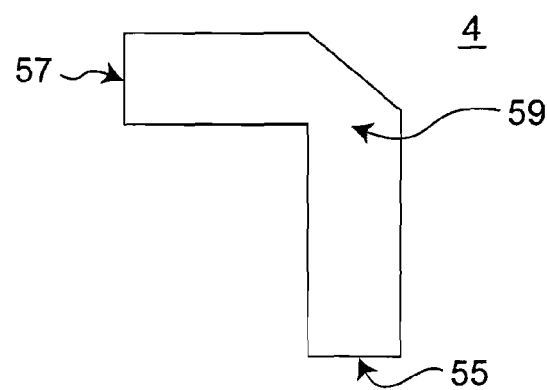
FIG. 5Q is a plan view of the side face of the optical integrator.

The side face shape 59 may have a shape such that the optical axis bends at the intermediate part of the optical integrator 4. FIG. 5Q shows the side face shape 59 of L-shape. In this case, the optical axis bends substantially perpendicularly. The optical integrator 4 shown in FIGS. 5M, 5N, 5O, 5P, and 5Q can be used with the incident end face 55 and the exit end face 57 interchanged.

Figure 6:
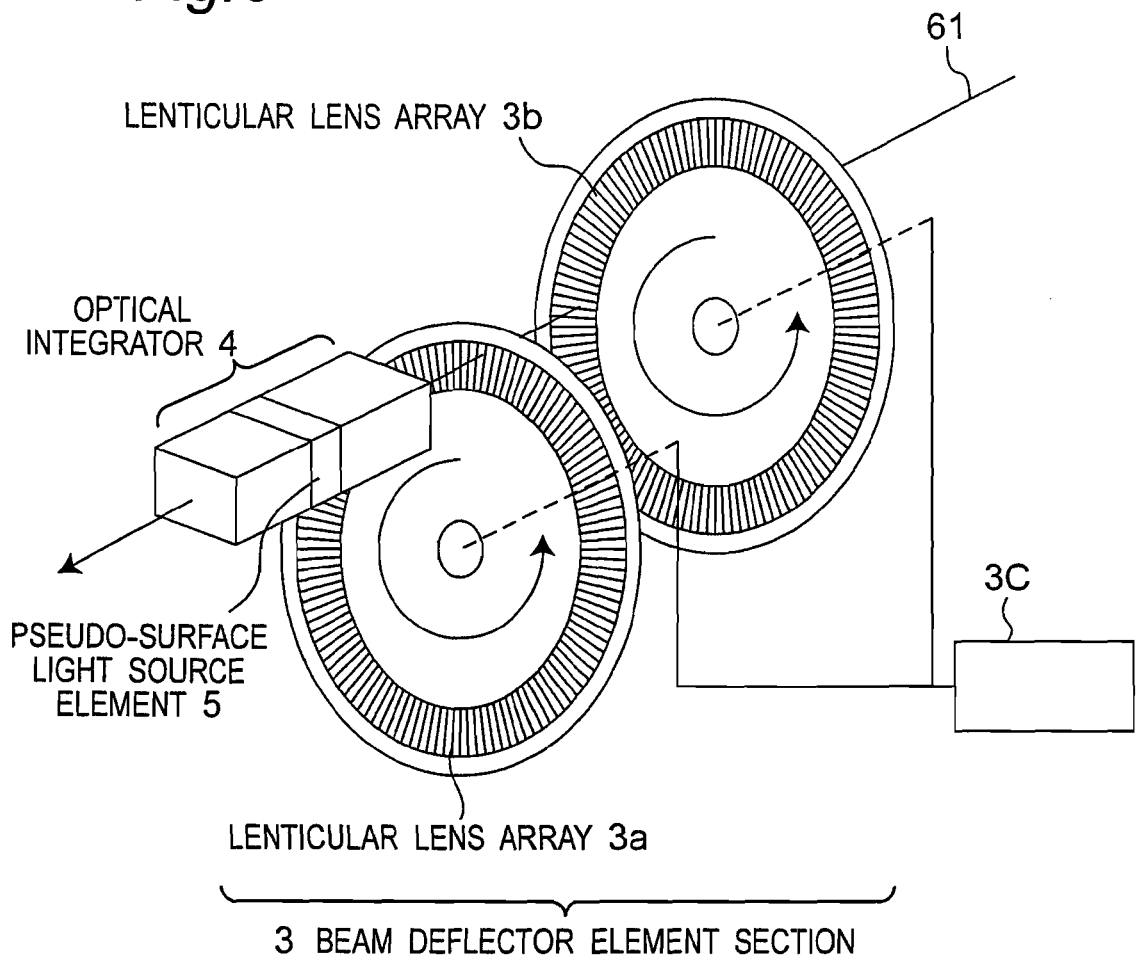
FIG. 6 is a perspective view of a beam deflector element section.

A configuration example of the beam deflector element section 3 will now be described. FIG. 6 is a diagram showing a configuration of the beam deflector element section 3.

The laser image display 100 according to the present invention provides temporal change to the speckle noise pattern by temporally changing the light source image of the illumination light source. Thus, the beam deflector element section 3 is desired to temporally control the advancing direction (beam deflecting direction) of the laser light entering the optical integrator 4. In the laser image display 100, the lenticular lens arrays 3a and 3b and the beam deflector element control section 3C are arranged for controlling the advancing direction of the laser light 61 entering the optical integrator (rod integrator) 4. The advancing direction of the laser light is temporally changed by rotating the lenticular lens arrays 3a and 3b. The lenticular lens array 3a deflects the advancing direction of the laser light 61 with respect to a long side direction of the rod integrator (optical integrator 4) shown in FIG. 6, and the lenticular lens array 3b deflects the advancing direction of the laser light 61 with respect to a short side direction of the rod integrator (optical integrator 4). The lenticular lens arrays 3a and 3b are lens arrays having a substantially uniform cross sectional shape in a radial direction. The laser light 61 is deflected by the convex shape (or concave shape) of each lens, and entered to the rod integrator (optical integrator 4).

Figure 7:
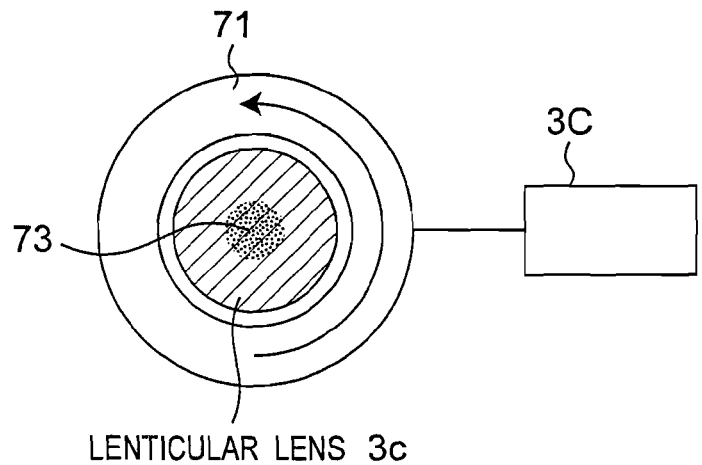
FIG. 7 is a diagram of a variant of the beam deflector element section.

FIG. 7 is a variant of the lenticular lens of a beam deflector element section 7. The lenticular lens 3c is a circular lenticular lens having a substantially uniform cross section in one direction and having a circular outer peripheral part. The circular lenticular lens 3c is gripped by a hollow motor 71 at the outer peripheral part, and is rotatable with the hollow motor 71 by means of the beam deflector element control section 3C. A spot 73 illustrates the position at where the laser light from the laser light source transmits through the circular lenticular lens. The laser light is deflected in a momentarily changing direction by the rotation of the circular lenticular lens 3c. The beam deflection angle θ given at this time and the maximum deflection angle $\theta_1$ are defined by the numerical aperture (NA) of the circular lenticular lens 3c.

<<Desirable Relationship of Maximum Beam Deflection Angle $\theta_1$, Half-Value Scattering Angle $\phi_1$ etc.>>

The maximum value $\theta_1$ of the beam deflection angle with respect to the optical axis of the laser light deflected by the beam deflection control element 3, and the average scattering angle $\phi_1$ with respect to the parallel laser light of the pseudo-surface light source element 5 are preferably $\theta_1 > \phi_1$. The scattering angle of the pseudo-surface light source element 5 preferably has a scattering angle distribution similar to Gauss distribution to exhibit an effective pseudo-surface light source effect. The angular distribution of the laser light projected to the modulation element 7 or the screen 10 is desired to be uniform in order to effectively reduce the speckle noise, and is desirably an angular distribution up to the F number F of the projecting optical system 8 to eliminate the loss of the projecting optical system 8. In order to satisfy the both desires, the angular distribution of the laser light illuminating the modulation element 7 is desirably an angular distribution similar to a top hat shape. To obtain such desired angular distribution, it is preferred that the angle control by the beam deflection control element 3 capable of performing an accurate angular distribution control effectively remains in the illumination laser light. To this end, the relationship $\theta_1 > \phi_1$ is desirably met. $\theta_1 > 2 \cdot \phi_1$ is desirable in order to more accurately perform the angle control.

The relationship

[Eq. 2]

$$0.7 \times \tan^{-1}\left(\frac{1}{2F}\right) < \frac{1}{a}\sqrt{\theta_1^2 + \phi_1^2} < 1.2 \times \tan^{-1}\left(\frac{1}{2F}\right) \qquad (1)$$

is preferably satisfied between the F number F of the projecting optical system 8, the magnification a of the projective optical system 6, the maximum beam deflection angle $\theta_1$ of the beam deflection control element 3, and the half-value scattering angle $\phi_1$ of the pseudo-surface light source element 5 of the image display device 100 of the present invention. When the relationship (1) is satisfied, the loss in amount of light is small and the speckle noise is efficiently removed when projecting the light onto the screen 10.

<Result of Image Equality Evaluation>

The image quality evaluation was performed using the image display device 100. The evaluating target was the magnitude of the amount of light and the speckle noise reaching the screen 10. The amount of light reaching the screen was measured with power meter. The speckle noise was evaluated by photographing the screen 10 with vision camera. A front projection matt screen was used for the screen 10. The vision camera includes a lens corresponding to the eye, a lens for enlarging the speckle on the virtual retina on a CCD, and the CCD. In evaluating the speckle noise, the green laser light was emitted only from the green laser light source 1G, a uniform image was displayed on the screen 10, and the ratio σ/X of the CCD light receiving amount average value X of the uniform image and the standard deviation σ of the intensity variance by the speckle noise was used. The rotatable lenticular lens was used to control the beam deflection angle, and the beam deflection angle $\theta_1$ (=$\sin^{-1}$(NA)) was changed using the lenticular lens having different NA. In the pseudo-surface light source element 5, the element having random concave-convex pattern of hologram pattern was performed with anti-reflection coating, and was sandwiched and fixed between two rod integrators. The plurality of pseudo-surface light source elements 5 having different half-value scattering angle $\theta_1$ was used. The magnification a of the projective optical system was 2 and the projecting optical system F number F was 2.5.

The evaluation result is shown in FIG. 8. For comparison, a state in which the rotation of the lenticular lens is stopped and the light source image of the laser light used for illumination is temporally made stationary is obtained in condition 10. Condition 11 shows the result obtained when the pseudo-surface light source element 5 is not inserted into the rod integrator, where the amount of light reaching the screen in this case is 1 and light amount (power) comparison is performed.

In conditions 10, 11, intensity fluctuation by noise of 10% or more at which the speckle noise can be visually recognized by the observer is found, whereas in conditions 1 to 10, the noise is reduced to less than 10%. From the result comparison, the speckle noise is found to reduce when the illumination laser light is pseudo-surface light source processed and the light source image is temporally changed.

When the maximum beam deflection angle $\theta_1$ by the beam deflection control element 3 is made to lower than or equal to the half-value scattering angle $\phi_1$ of the surface light source means ($\theta_1 \leq \phi_1$, conditions 7, 8, 9), light amount (power) loss of greater than or equal to ten percent occurs, but if $\theta_1 > \phi_1$ for the same maximum beam deflection angle $\theta_1$, the beam angle control of the entire optical system becomes possible, where the light amount (power) loss is small and the speckle noise is reduced in conditions 1 to 4 and 6. Furthermore, in a relationship satisfying $0.7 \cdot \tan^{-1}(\frac{1}{2}F) < [(\theta_1)^2 + (\phi_1)^2]^{1/2}/a$ (conditions 2 to 6), the speckle noise has intensity fluctuation of less than or equal to 5% which the observer barely recognizes, and thus sufficient angle variation control of the illumination light including the projecting optical system 8 is performed. Furthermore, the light amount (power) loss is small and high efficiency including the projecting optical system 8 is achieved in a relationship satisfying $[(\theta_1)^2 + (\phi_1)^2]^{1/2}/a < 1.2 \cdot \tan^{-1}(\frac{1}{2}F)$ (conditions 2 to 4 and 6).

<Variant of Illumination Optical System 2>

Figure 9:
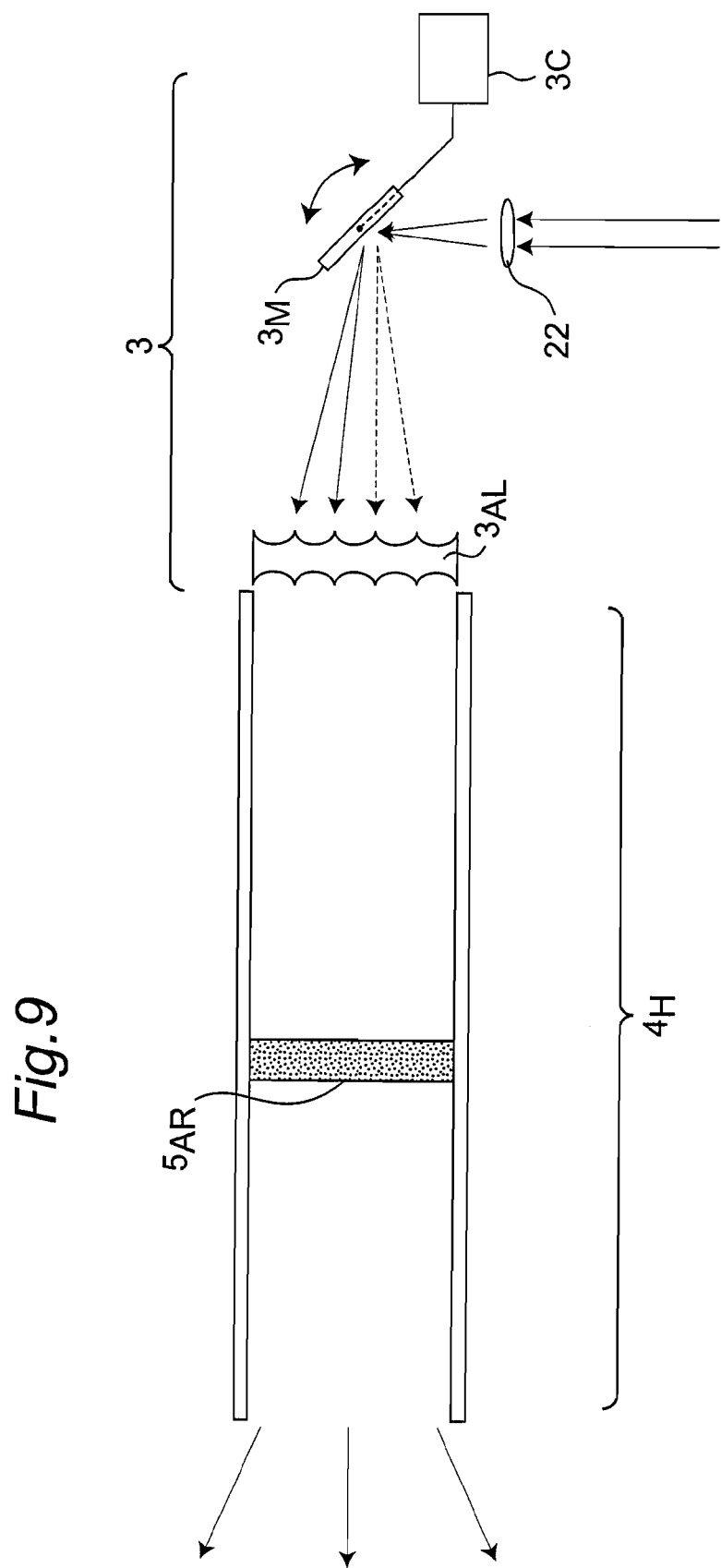
FIG. 9 is a schematic configuration diagram of a variant of the illumination optical system.

FIG. 9 is a schematic configuration view of a variant of the illumination optical system 2.

The light emitted from the laser light source is passed through the lens 22, one-dimensional vibration mirror 3M, and the lens array 3AL, formed to a substantially uniform beam shape having a rectangular shape by being repeatedly subjected to internal reflection by a hollow optical integrator 4H with a rectangular exit end face, and thereafter enters the pseudo-surface light source element 5AR. The pseudo-surface light source element 5AR is inserted into the hollow rod integrator 4H.

In the present variant, the beam deflection angle control of the laser light entering the optical integrator 4H is carried out so that the light source image of the laser light temporally changes by using a combination of the vibration mirror 3M and the lens array 3AL. In the present variant, in particular, one-dimensional deflection angle variation is provided to the laser light by vibrating the vibration mirror 3M only in one-dimensional direction, and two-dimensional deflection angle variation is provided to the laser light by the lens array 3AL.

Figure 10A:
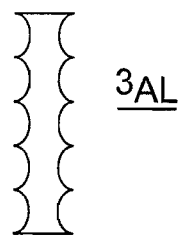
FIG. 10A is a side view of a lens array.
Figure 10B:
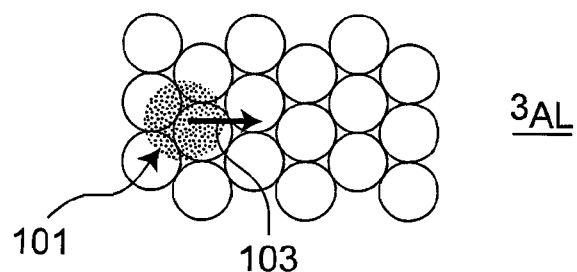
FIG. 10B is a plan view of the lens array.

FIGS. 10A, 10B, 10C and 10D are diagrams showing a lens array 3AL and alternative examples of the lens array 3AL used when using the one-dimensional vibration mirror 3M. FIG. 10A is a diagram of the lens array 3AL seen from a direction perpendicular to the optical axis. FIG. 10B is a diagram of the lens array 3AL seen from the optical axis direction. When the one-dimensional vibration mirror 3M vibrates a spot 101 at which the laser light enters, the lens array 3AL moves in the direction of an arrow 103. The lens array 3AL has a spherical lens arranged in a zigzag form with respect to the arrow 103 so as to provide a deflection angle different in the up and down direction in the figure by the movement of the spot by the one-dimensional vibration mirror 3M. The lens array 3AL provides a temporally changing two-dimensional beam deflection angle to the laser light by such movement of such spot 101.

Figure 10C:
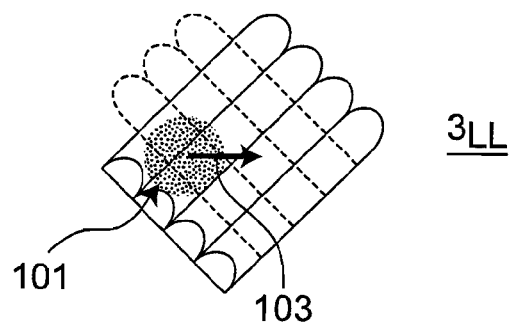
FIG. 10C is a diagram of a lens array formed by having two lenticular lenses being orthogonal to each other.
Figure 10D:
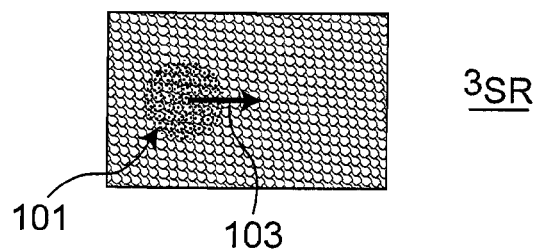
FIG. 10D is a diagram of a hologram element.

FIG. 10C is a diagram showing an alternative example of the lens array 3AL. The present alternative example is a lens array 3LL having a lens shape laminated orthogonal to the lenticular lens. The lens array 3LL includes two lenticular lens arrays in a direction perpendicular to the plane of drawing. The first lenticular lens array forms an angle of +45 degrees with respect to a moving direction (arrow) 103 of the spot 101, and the second lenticular lens array forms an angle of −45 degrees with respect to the arrow 103. In the lens array 3LL including two lenticular lens arrays orthogonal in plan view, temporally two-dimensional beam deflection angle variation is provided by the movement of the spot 101 by the vibration mirror 3M.

Fig. D is a diagram showing an alternative example of another further lens array 3AL. The present alternative example is a hologram element 3SR including a surface relief hologram element. The hologram element 3SR provides two-dimensional deflection angle (diverging characteristics) by the non-periodic surface concave-convex pattern. A light source image that temporally changes so that the phase differs two-dimensionally is exit by entering the light ray to the element 3SR while being temporally moved in the direction of the arrow 103.

The lens arrays 3AL and 3LL are preferable as the beam deflection angle can be accurately controlled by the numerical aperture (NA) of the lens and the swinging angle of the vibration mirror.

In order to have the beam deflection angle uniformed two-dimensionally, the deflection angle variation of the lens array 3AL and the like is made small with respect to the swinging angle direction (direction of arrow 103) of the vibration mirror, and the total beam deflection angle provided to the laser light by the lens array 3AL and the vibration mirror 3M is preferably equalized in a direction of the arrow 103 and in a direction perpendicular to the arrow 103.

The lens arrays 3AL, 3LL, and the hologram element 3SR merely need to be arranged on the incident side of the optical rod integrator 4, and may be attached to the incident end face or may be incorporated inside the incident side in the case of the hollow rod integrator 4H.

When using the one-dimensional vibration mirror 3M, an element for providing a diffusion angle having two-dimensional anisotropy is preferably used for the pseudo-surface light source element 5AR (FIG. 9) to be inserted into the optical integrator 4 in order to equalize the two-dimensional distribution (direction parallel to and perpendicular to the arrow 103) of the beam deflection angle. Specifically, a surface relief hologram is formed on the surface of the pseudo-surface light source element 5AR, and the surface relief pattern has a concave-convex period larger for a vibrating direction of the vibration mirror 3M than in the direction perpendicular to the vibrating direction to desirably reduce the diffusion angle of the vibrating direction.

The one-dimensional vibration mirror 3M is used in the present variant, but a vibration mirror that can vibrate two-dimensionally may be used. When the two-dimensional vibration mirror is used, it may independently provide the beam deflection angle that changes two-dimensionally to the laser light, or may control the beam deflection angle of the laser light in combination with the lens array and the like.

<Laser Light Source Configuration Example 1>

Figure 11:
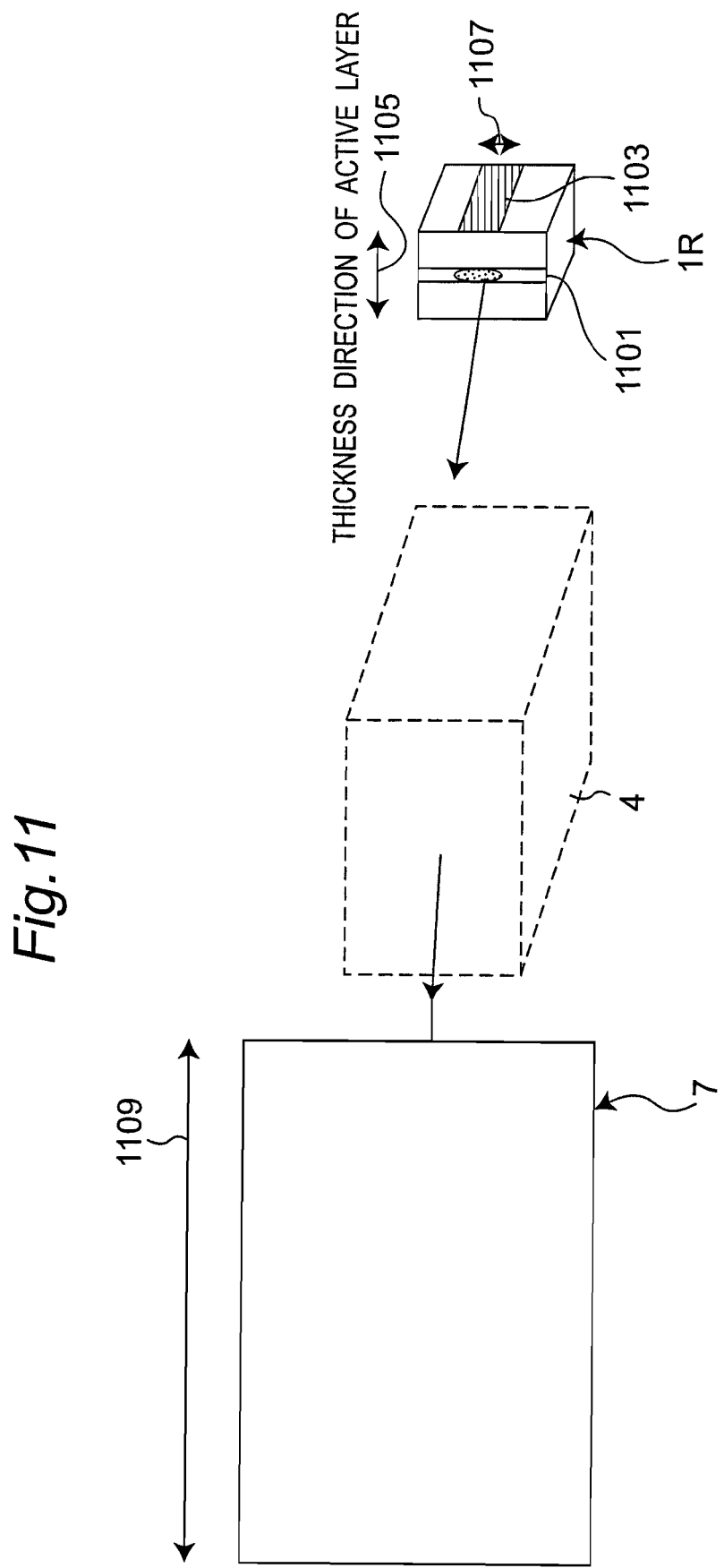
FIG. 11 is a diagram of an arrangement of a laser light source and a modulation element.

FIG. 11 is a view showing a configuration example of the laser light source. In FIG. 11, the red laser light source 1R of the image display device 100 is a semiconductor laser, and the modulation element 7 has an effective surface (region actually used for image display) of a rectangular shape. In the present invention, a long side direction 1109 of the effective surface of the modulation element with rectangular effective surface and a thickness direction 1105 of an active layer of the semiconductor laser are preferably parallel to each other.

The effective surface of the modulation element 7 has a rectangular shape in correspondence to the shape of the image to be displayed, and specifically has an aspect ratio of horizontal:vertical=4:3 or 16:9. In the laser image display 100, the laser light exiting from the effective surface is enlarged by the projecting optical system and projected onto the screen 10. The semiconductor laser element generally has a layered configuration in which at least clad layer/active layer 1101/clad layer are stacked on a substrate, and the laser light is emitted from the end face of the active layer 1101. The spread angle of the laser light emitted from the active layer 1101 of the semiconductor laser element differs between the thickness direction 1105 of the layer and the direction parallel to the layer, and spreads greater in the thickness direction of the layer. Thus, when using the emitted laser light without waste even when collimating the laser light, a laser light having an elliptical shape long in the thickness direction 1105 of the active layer can be used.

The effective surface of the modulation element 7 must be substantially uniformly illuminated in image display. In order to uniformly illuminate the laser light emitted from the laser light source onto the modulation element 7 having a rectangular effective surface, illumination is performed with the beam shape shaped to a rectangular shape using the optical integrator 4 and the hologram element. The optical system is arranged such that the long side direction 1109 of the modulation element 7 and the thickness direction 1105 of the active layer of the semiconductor laser become parallel, so that illumination is performed with the intensity of the illumination laser light uniformed and the effective usage efficiency of the laser light enhanced. For instance, when employing the rod integrator using internal reflection for the optical integrator 4, extent of uniforming the illumination laser light depends on the number of internal reflections. In this case, when using the laser light in which the spread angle of the laser light emitted from the light source is the same vertically and horizontally, the number of internal reflections of the laser light in the long side direction becomes less, and uniforming of the laser light intensity becomes difficult. Thus, the long side direction of the exit end face of the rod integrator 4 and the long side direction of the modulation element 7 are arranged parallel, and the thickness direction 1105 of the active layer is made parallel to the long side direction, so that the laser light having a large spread angle in the long side direction easily enters the rod integrator 4, the number of internal reflections in the long side direction of the exit end face of the rod integrator is made to about the same extent as the short side direction of the exit end face, and the uniformed illumination laser light can be easily obtained. Even if the fly eye integrator or the hologram element is used for the optical integrator 4, uniforming in the long side direction also becomes difficult when beam shaping the incident laser light to a rectangle, but the elliptical laser light that is long in the long side direction of the optical integrator 4 can be used as the beam to be irradiated to the optical integrator 4 by arranging the thickness direction of the active layer parallel to the long side direction, and thus the intensity of the illumination laser light can be uniformed without loss.

The semiconductor laser light source merely needs to be a semiconductor laser having a layered configuration irrespective of the exit wavelength. Similarly, in the case of using the multichip array in which a plurality of semiconductor laser elements is used, the thickness direction of the active layer of each chip is desirably arranged parallel to the long side direction of the modulation element. Similarly, for a multi-strip including a plurality of light emission spots in the active layer and for a multi-stack configuration including a plurality of active layers in the element, the thickness direction of the active layer and the long side direction of the modulation element are desirably arranged in parallel.

The laser image display 100 according to the present invention has features in that the width 1107 of the stripe 1103 of the semiconductor laser is greater than or equal to ten times the output wavelength. When using the two-dimensional modulation element in which the effective surface is a rectangle, the beam shape is shaped to a rectangle of substantially uniform intensity to illuminate substantially uniformly, where efficient beam shaping can be carried out by having the width 1107 of the stripe 1103 to greater than or equal to ten times the output wavelength.

The stripe of the semiconductor laser is a configuration for limiting the spread of current in the active layer, and is created by the shapes of an electrode, an insulation layer, and an active layer, where only the stripe region of the active layer is excited through current injection, light is guided along the stripe region, and the light is exit from the end face. The stripe width is the width of the active layer to be injected with current, and relates particularly to the stripe width of the end face from which the laser light exits in the present invention. In the present invention, the near field pattern of the emitted laser light is made to a shape that is spread extremely in the lateral direction by having the stripe width to greater than or equal to ten times the output wavelength. Accordingly, the half-angle of the laser light spread in a direction parallel to the active layer of the emitted laser light is made to less than or equal to approximately $\frac{1}{10}$ (rad). The laser light emitted from the semiconductor laser has a substantially uniform rectangular shape, and thus enters the beam shaping element including the optical integrator and the hologram element, but the optical design from the laser light source to the beam shaping element can be carried out with control of only in the thickness direction of the active layer by having the spread angle in one direction of the emitted laser light small. Specifically, the spread error becomes smaller than or equal to one millimeter when the spread angle is smaller than or equal to $\frac{1}{10}$ (rad) since the distance from the light source to the beam shaping element is a few millimeters to a few dozen millimeters, and thus optical design can be carried out without requiring a special control element. Furthermore, in order to facilitate the design of the optical system, the stripe width is more preferably made greater than or equal to twenty times of the output wavelength. By being made twenty times or more, the emitted laser light can be designed as a substantially parallel light with respect to a direction parallel to the layer of the laser element.

Furthermore, it is preferable to arrange the laser light source that emits the laser light of the shortest wavelength closest to the modulation element when using a single modulation element 7 and performing modulation of the laser light sources 1B, 1G, and 1R of a plurality of wavelengths (colors) as in the laser image display 100 (see FIG. 1). The image display device 100 includes laser light sources 1B, 1G, and 1R of wavelengths blue, green, and red, and the blue laser light source 1B of the light having the shortest wavelength is arranged closest to the modulation element 7.

In the case of the laser image display having a configuration of guiding a laser light having a plurality of wavelengths to the single modulation element 7, the loss due to absorption and reflection of the laser light by optical components becomes the largest in the laser light of short wavelength. Thus, selection of optical material and specification of coating with respect to the laser light of short wavelength becomes the most difficult. The number of optical components to be acted is made less than the number of optical components to be acted by the laser light of longer wavelength and the loss in amount of light of the laser light of short wavelength is reduced by arranging the laser light source that emits the laser light having the shortest wavelength so as to be closest to the modulation element 7 (so that its light path becomes the shortest). In particular, the effect of the present invention becomes significant when the shortest wavelength of the wavelengths of the laser lights emitted from the laser light sources is the wavelength having a peak at less than 460 nanometers.

<Laser Light Source Configuration Example 2>

Figure 12:
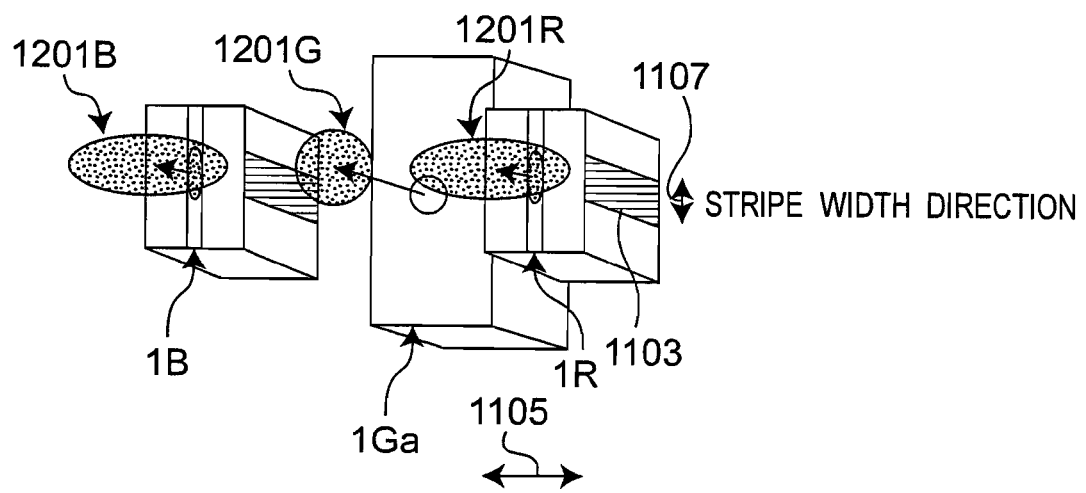
FIG. 12 is a diagram of a laser light source package configuration example 1.
Figure 13:
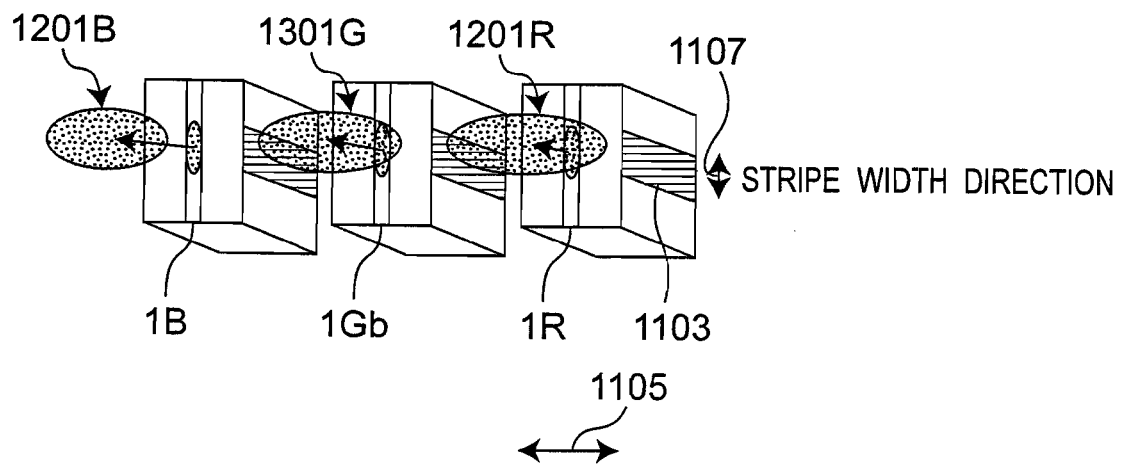
FIG. 13 is a diagram of a laser light source package configuration example 2.

The laser light source of the laser image display 100 may have each light source arranged individually as shown in FIG. 1, but one laser light source package may be used. The laser light source package includes a laser light source for emitting a plurality of wavelengths substantially in one housing. FIGS. 12 and 13 show a configuration example of the laser light source package. In FIGS. 12 and 13, illustrations of the package housing are omitted to clarify the figure.

A package example 1 shown in FIG. 12 is a laser light source package including a red semiconductor laser light source 1R, a green SHG laser light source 1Ga, and a blue semiconductor laser light source 1B. In the laser image display 100, the present package has each laser light source 1R or 1B arranged so that the thickness direction 1105 of the active layer is parallel to the long side direction 1109 (FIG. 11) of the modulation element 7. A semiconductor laser light source mount (not shown) is arranged on both sides of the semiconductor laser light source, and the SHG laser light source can be arranged towards the back side in a laser light exiting direction from the semiconductor laser. Three laser light sources 1R, 1Ga and 1B may be formed as one package, so that an optical system for wave combining such as dichroic mirror 21 and the like may be omitted, the optical system can be simplified, the semiconductor lasers 1R and 1B preferably emit the laser light preferably having a elliptical shape to facilitate the uniforming of the intensity of the illumination laser light with respect to the modulation element 7. A relationship of $R_W > B_W$ is preferably satisfied between the stripe width $R_W$ of the red laser light source 1R and the stripe width $B_W$ of the blue laser light source. The shape of the red laser light and the shape of the blue laser light become similar to each other by satisfying such relationship. Thus, an advantage in that the control of laser light in the illumination of the modulation element 7 becomes easier is obtained.

A package example 2 shown in FIG. 13 is a laser light source package example using a green semiconductor laser light source 1Gb. In the present package example, the thickness of the active layers of the laser light sources 1R, 1Gb, and 1B are all directed in the same direction, and such direction is parallel to the long side direction 1109 (FIG. 11) of the modulation element 7 in the laser image display 100. In this case, in addition to the relationship $R_W > B_W$, a relationship $R_W > B_W$ is preferably satisfied for the stripe width $G_W$ of the green laser light source 1Gb. The shape of the red laser light and the shape of the green laser light become similar to each other and an advantage in that a control becomes easier is obtained by configuring the package in this manner. Furthermore, the widths of the stripes of the three semiconductor laser light sources desirably satisfy a relationship $R_W > G_W > B_W$.

The semiconductor lasers shown in FIGS. 12 and 13 have single stripe configurations where one stripe is formed for one chip, but if the thickness direction 1105 of the active layer of each semiconductor laser is parallel to the long side direction 1109 (FIG. 11) of the modulation element 7, a semiconductor laser using the multi-stripe configuration in which a plurality of stripes is formed in the active layer, a multi-stack configuration in which a plurality of active layers is arranged in one chip, or a multichip configuration in which one light source is configured by a plurality of chips may be used.

Second Embodiment

Figure 14:
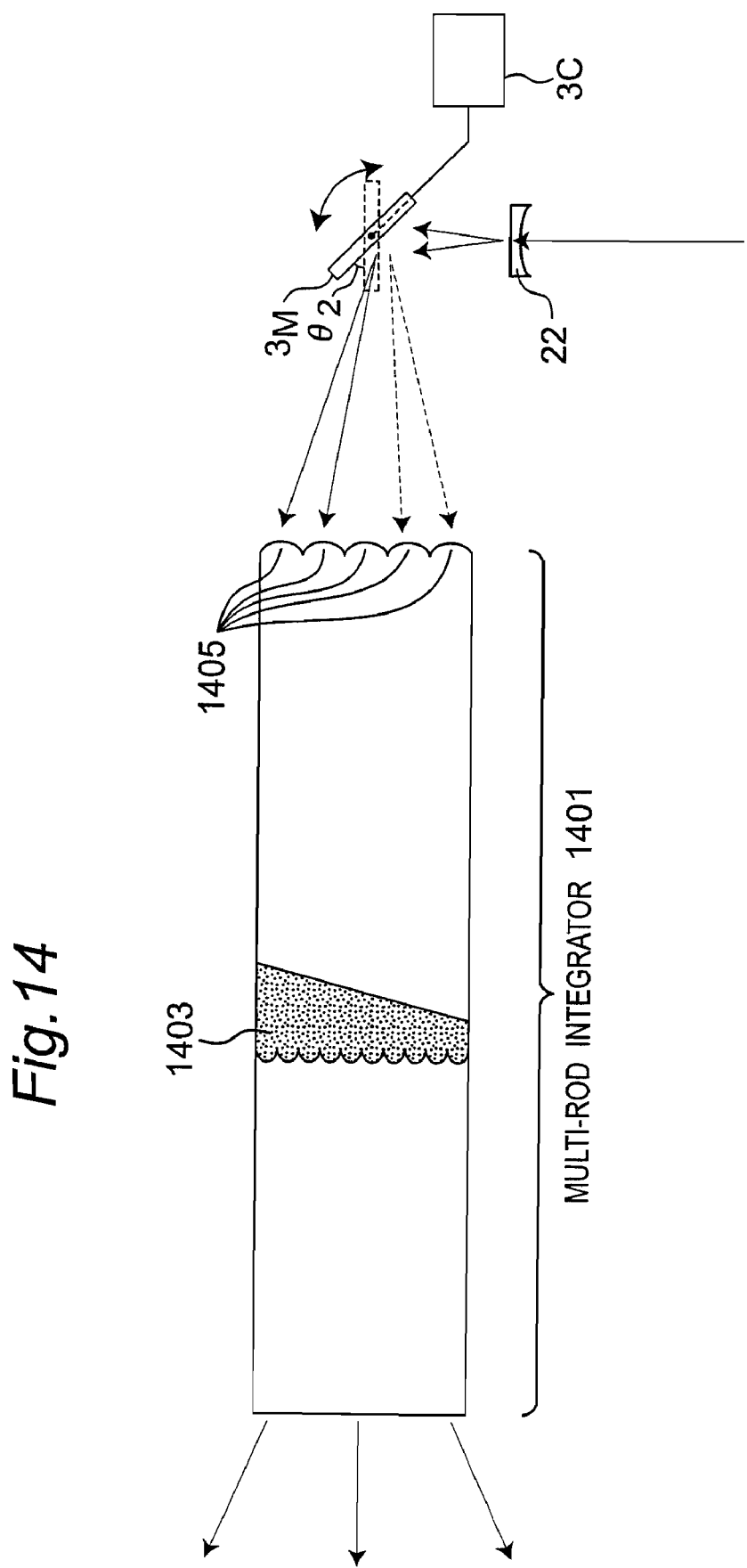
FIG. 14 is a diagram of an illumination optical system according to a second embodiment.

FIG. 14 is a schematic diagram showing another example of an illumination optical system in the laser image display according to the present invention. In the present example, the laser light emitted from the laser light source is passed through the lens 22 and the vibration mirror 3M capable of vibrating in an oscillating manner, and enters a multi-rod integrator 1401 having a rectangular exit end face. The multi-rod integrator 1401 has a configuration of sandwiching a birefringence pseudo-surface light source element 1403, and has a lens array 1405 at the incident end face.

The illumination optical system of the second embodiment performs beam deflection angle control of the incident laser light of the multi-rod integrator 1401 (optical integrator) so that the light source image of the laser light temporally changes by cooperative operation of the vibration mirror 3M and the lens array 1405 formed on the multi-rod integrator 1401. In the present illumination optical system, the maximum beam deflection angle $\theta_1$ is given by the swinging angle $\theta_2$ of the vibration mirror 3M and the numerical aperture (NA) of the lens configuring the lens array. In the configuration of FIG. 14, beam deflection of an angle larger than the swinging angle $\theta_2$ of the vibration mirror 3M is realized by cooperative operation of the vibration mirror 3M and the lens array 1405. Thus, an advantage in that control is facilitated is obtained since the swinging angle $\theta_2$ of the vibration mirror 3M can be made smaller than the desired maximum beam deflection angle $\theta_1$. In the present example, the lens array 1405 and the rod integrator 1401 have an integrated configuration. Thus, it is a preferable configuration in that efficiency can be enhanced due to integration of optical components.

The laser image display according to the present invention preferably includes a polarization resolving means which is a means for randomizing the polarization of the laser light in the illumination optical system. In the example of FIG. 14, polarization is resolved by the birefringence pseudo-surface light source element 1403. The polarization surface of the laser light which is a linear polarization is randomly changed by resolving polarization. The sufficiently randomized laser light is an un-polarized light. The speckle noise is generated by interference of laser lights, but the speckle noise is reduced since the laser lights, which polarizing directions are orthogonal, do not interfere. An element made of birefringent material having a non-uniform thickness distribution with respect to optical axis is preferably used as a means for resolving polarization. The polarization resolving means does not need to be arranged in the optical integrator and its effect can still be obtained by being inserted and arranged on the light path of the laser light similar to the lens and the mirror. When the illumination optical system includes such polarization resolving means, the micro-mirror device such as DMD is preferably used for the modulation element 7.

The pseudo-surface light source element used in the present invention is made of material having birefringence and has a thickness distribution in plane substantially perpendicular to the optical axis, and preferably includes a polarization resolving means. The birefringence pseudo-surface light source element 1403 is made of birefringent material and has a thickness distribution (constant inclination etc.) in plane, and generates polarization of different directions in the laser light due to difference in thickness at the position the light passes to resolve polarization. Specifically, the pseudo-surface light source element 1403 is made of organic material having birefringence such as polycarbonate, where concave-convex pattern is formed or diffusion particles are mixed on the surface for pseudo-surface light source processing. The pseudo-surface light source element 1403 is arranged so that the optical axis defined in time of molding is inclined with respect to the polarizing direction of the laser light, and resolves polarization by having thickness distribution in plane. The birefringence pseudo-surface light source element 1403 is preferably arranged in the optical integrator 1401 similar to the first embodiment. If the birefringence pseudo-surface light source element 1403 is arranged in the optical integrator 1401, distortion due to thickness distribution of the birefringence pseudo-surface light source element 1403 and loss of laser light that illuminates the modulation element 7 caused by scattering operation responsible for the pseudo-surface light source operation is suppressed to a minimum. Specifically, the birefringence pseudo-surface light source element 1403 having an inclination on one side is inserted and fixed between the rod integrator having an inclined end face and the rod integrated having a vertical end face. The polarization still can be resolved by the thickness distribution from the concave-convex pattern even if birefringent material having concave-convex pattern is used.

The multi-rod integrator 1401 of the second embodiment is a preferred mode in which the functions of uniforming the light, pseudo-surface light source processing, polarization resolving, and beam deflection are integrated, and thus the number of optical components is reduced.

Conventionally, having the illumination made uniform and to a rectangular shape by the fly eye lens has been proposed with respect to the laser light source, but since a great light amount loss that cannot be imaged on the modulation element occurs when the pseudo-surface light source element is inserted to the fly eye lens illumination optical system, an internal reflection integrator (rod integrator) having a rectangular exit end face is more preferably used.

The beam deflector element section used in the laser image display of the present invention may use a movable diffusion plate. However, movable lens array or a vibration mirror is more preferable to use. An accurate control including angular distribution of the beam deflection angle can be realized by using the movable lens array or the vibration mirror. Thus, if the movable lens array or the vibration mirror is used, an angular distribution uniform with the control of angle variation up to the projection-possible angle of the projecting optical system 8 is provided and thus is preferable. The control in the number of internal reflections in the optical integrator is also facilitated. When the movable diffusion plate is used, there is a disadvantage in that the component in which the beam deflection is relatively small becomes strong, and scattering loss increases when attempting to increase the beam deflection angle.

Third Embodiment

Figure 15:
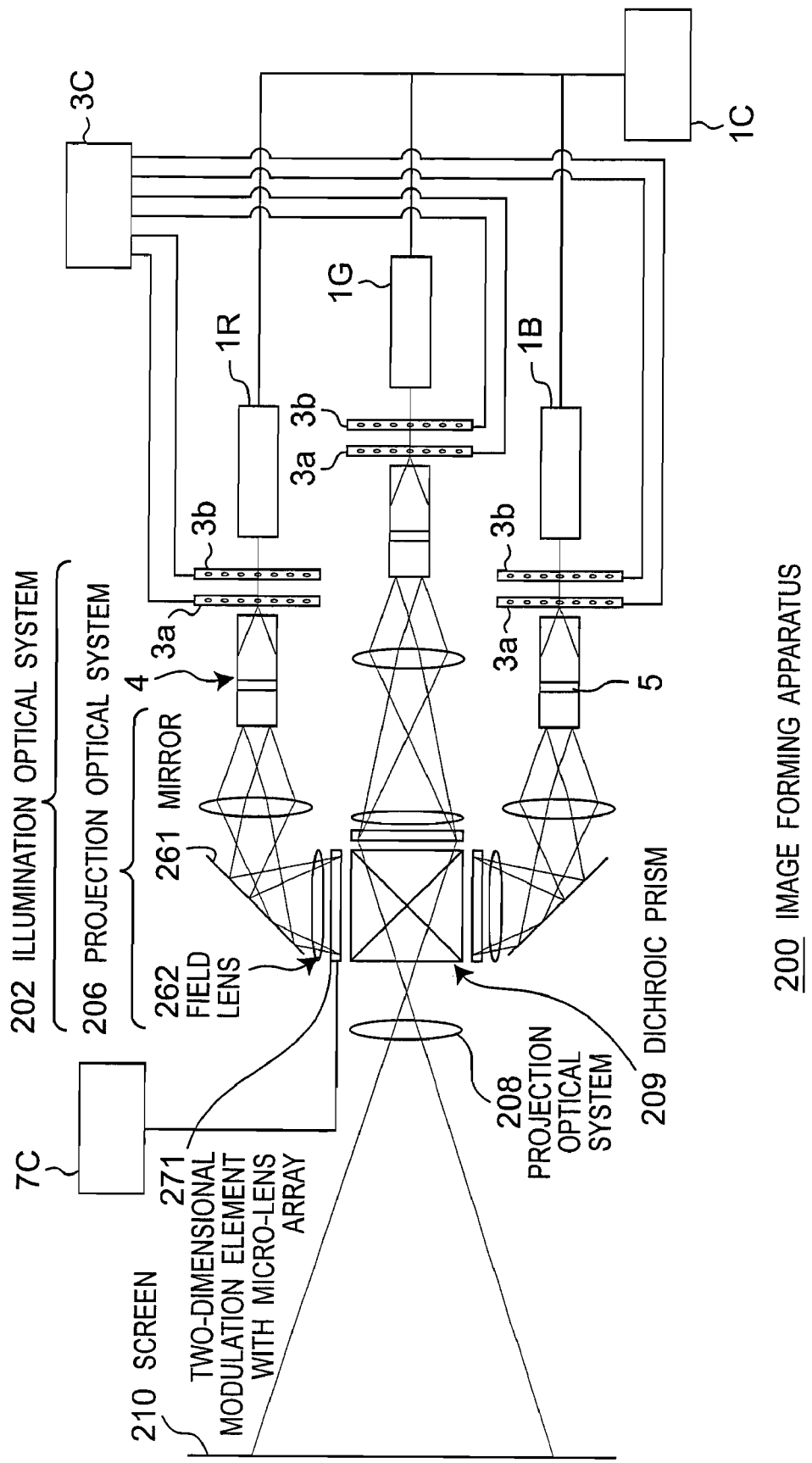
FIG. 15 is a configuration diagram of a laser image display according to a third embodiment.

FIG. 15 is a schematic diagram of a laser image display 100 according to a third embodiment of the present invention. In FIG. 15, same reference numerals are used for components same as in FIG. 1.

The laser lights emitted from the laser light sources 1R, 1G, and 1B of RGB three colors are respectively guided to an illumination optical system 202 which is an optical system for emitting the laser light for illuminating a two-dimensional modulation element 271 with micro-lens array. The illumination optical system 202 includes rotatable lenticular lens arrays 3a, 3b configuring the beam deflector element section, the optical integrator 4, the pseudo-surface light source element 5, and a projective optical system 206, where the laser light having a substantially rectangular and uniform intensity distribution is illuminated on the modulation element 271. The projective optical system 206 includes a mirror 261 and a field lens 262. Each color laser light is subjected to modulation in the spatial modulation element 271 with micro-lens array, wave-combined in the dichroic prism 209, and projected onto the screen 210 thereby displaying a color image through spatial additive color mixing. The pseudo-surface light source element 5 may be arranged on the mirror 261 and the like.

The modulation element 271 has a configuration in which one micro-lens is formed on the upstream side of the illumination optical system 202 for each pixel which modulates the laser light, and arranged in an array form. In the laser image display 200 of the present invention, the modulation element 271 includes a micro-lens with respect to each element on the upstream side of the illumination optical system 202 and serves as a means for enlarging the deflection of the beam. The beam deflection angle is temporally and steadily controlled by the rotatable lenticular lens arrays 3a and 3b, but the micro-lens of the modulation element 271 further enlarges such beam deflection angle. For instance, the rotatable lenticular lens provides beam deflection angle of $\theta r$, and the maximum beam deflection angle $\theta_1$ in the present laser image display is enlarged by the micro-lens array to $\theta_1=\theta r+a\cdot\sin^{-1}$ (NAm), where the magnification of the projective optical system 206 is a and the numerical aperture of the micro-lens is NAm. Thus, the micro-lens array of the modulation element 271 can enlarge the beam deflection angle even if the beam deflection angle by the temporally changing portion (rotatable lenticular lens arrays 3a and 3b in the present embodiment) of the beam deflector element section is relatively small. Thus, the laser image display 200 has advantage in that a relatively large maximum beam deflection angle can be provided and in that control is facilitated.

Specifically, the modulation element 271 is made by a combination of a transmissive liquid crystal element and a polarization plate, and the micro-lens array is formed on the liquid crystal element. The micro-lens array collects the light at the electrode part for operating the liquid crystal element so as not to pass through to enhance the numerical aperture of the element, and thus is advantageous.

The present embodiment is not limited to the illustrated configuration, and may be used in the laser image display using a single color laser light source or may be used in the laser image display using a laser light source of three or more colors. The laser light source of each color of the present invention may be configured by a plurality of laser elements for light emitting substantially the same wavelength or may be configured by a single element.

The laser image display according to the present invention may be used in a front transmissive display using a scattering reflective screen or a rear projection display using a transmissive screen.

INDUSTRIAL APPLICABILITY

The laser image display according to the present invention has been described using the mode of displaying the image on the screen, but is also applicable to the case of displaying the image other than on the screen. It can, for example, be used in a semiconductor exposure device.

The invention claimed is:
1. A laser image display comprising:
a laser light source which emits a laser light;
a beam deflector element section which receives the laser light and deflects an advancing direction of the laser light;
a beam deflector element control section which controls an extent of deflection by the beam deflector element section;
an optical integrator having an exit end face and light guiding parts, wherein the optical integrator receives and guides the deflected laser light, and emits the laser light from the exit end face;
a pseudo-surface light source element which scatters the deflected laser light; and a modulation element which receives and modulates the laser light scattered by the pseudo-surface light source element,
wherein the pseudo-surface light source element is arranged between the light guiding parts of the optical integrator along a light path of the laser light.

2. The laser image display according to claim 1, wherein a shape of the exit end face of the optical integrator has similarity with a shape of an effective surface of the modulation element.

3. The laser image display according to claim 1, wherein the pseudo-surface light source element is arranged between the exit end face of the optical integrator and the modulation element along the light path of the laser light.

4. The laser image display according to claim 1, wherein the beam deflector element control section variably controls the extent of deflection by the beam deflector element section in time series.

5. The laser image display according to claim 1, wherein the pseudo-surface light source element provides different phases to the laser light depending on a position or an incident angle at which the laser light enters.

6. The laser image display according to claim 1, wherein:
the beam deflector element section is an element in which a deflecting operation on the laser light changes the light path of the laser light to a direction forming an angle $\theta$, the angle $\theta$ being an angle between 0 degree to $\theta_1$ degrees, with respect to the optical axis;
the beam deflector element control section controls the beam deflector element section such that the angle $\theta$ is temporally changed;
the pseudo-surface light source element is an element which performs a scattering operation of a half-value scattering angle $\phi_1$ to the laser light which enters with a direction parallel to the optical axis; and
the angle $\theta_1$ and the angle $\phi_1$ satisfy a relationship of $\theta_1 > \phi_1$.

7. The laser image display according to claim 1, wherein the pseudo-surface light source element changes a polarizing direction of incident laser light which enters the pseudo-surface light source element substantially at random.

8. The laser image display according to claim 1, wherein the modulation element includes a micro-lens which deflects the laser light entering a pixel contained in the modulation element, the micro-lens being arranged upstream with respect to the advancing direction of the laser light.

9. The laser image display according to claim 1, wherein:
the laser light source includes a semiconductor laser;
an effective surface of the modulation element has a rectangular shape; and
a thickness direction of an active layer of the semiconductor laser and a long side direction of the rectangular shape are parallel.

10. The laser image display according to claim 1, wherein:
the laser light source includes a first laser light source unit capable of emitting a first laser light having a first wavelength, and a second laser light source unit capable of emitting a second laser light having a second wavelength longer than the first wavelength; and
a light path length to the modulation element of the first laser light is shorter than a light path length to the modulation element of the second laser light.

11. The laser image display according to claim 6, further comprising:
a projective optical system, arranged between the pseudo-surface light source element and the modulation element along the advancing direction of the laser light, which causes the received laser light to enter the modulation element; and
a projecting optical system, arranged in downstream of the modulation element along the advancing direction of the laser light, which enlarges the modulated laser light,
wherein $$0.7 \times \tan^{-1}\left(\frac{1}{2F}\right) < \frac{1}{a}\sqrt{\theta_1^2 + \phi_1^2} < 1.2 \times \tan^{-1}\left(\frac{1}{2F}\right)$$

is satisfied, the variable a being a magnification of the projective optical system and the variable F being an F number of the projecting optical system.

12. The laser image display according to claim 7, wherein the pseudo-surface light source element is made of birefringent material having a non-uniform thickness distribution with respect to a direction perpendicular to the optical axis of an optical system in which the pseudo-surface light source element is involved.

13. The laser image display according to claim 9, wherein the semiconductor laser has a stripe width of greater than or equal to ten times of a wavelength of the laser light that the semiconductor laser can emit.

* * * * *